(12) United States Patent
Zeitzew

(10) Patent No.: US 6,674,687 B2
(45) Date of Patent: Jan. 6, 2004

(54) SYSTEM AND METHOD FOR NAVIGATION USING TWO-WAY ULTRASONIC POSITIONING

(75) Inventor: Michael A. Zeitzew, Los Angeles, CA (US)

(73) Assignee: Navcom Technology, Inc., Redondo Beach, CA (US)

( * ) Notice: Subject to any disclaimer, the term of this patent is extended or adjusted under 35 U.S.C. 154(b) by 0 days.

(21) Appl. No.: 10/057,662

(22) Filed: Jan. 25, 2002

(65) Prior Publication Data

US 2003/0142587 A1 Jul. 31, 2003

(51) Int. Cl.⁷ .............................................. H04B 1/59
(52) U.S. Cl. ...................................................... 367/6
(58) Field of Search ............................ 367/6, 13, 127, 367/128, 907

(56) References Cited

U.S. PATENT DOCUMENTS

| | | | |
|---|---|---|---|
| 4,097,837 A | * | 6/1978 | Cyr ................................. 367/6 |
| 4,254,478 A | | 3/1981 | Dumas .......................... 367/2 |
| 4,635,236 A | * | 1/1987 | Roberts ......................... 367/6 |
| 4,862,152 A | | 8/1989 | Milner ....................... 340/712 |
| 4,924,450 A | | 5/1990 | Brashear et al. ............ 367/118 |
| 4,964,104 A | | 10/1990 | Capurka ....................... 367/99 |
| 5,008,860 A | | 4/1991 | Riley et al. ..................... 367/6 |
| 5,165,064 A | | 11/1992 | Mattaboni ................... 356/152 |
| 5,214,617 A | | 5/1993 | Rouquette ................... 367/124 |
| 5,280,457 A | | 1/1994 | Figueroa et al. ............ 367/127 |
| 5,359,575 A | | 10/1994 | Williams et al. ............ 367/127 |
| 5,426,617 A | | 6/1995 | Cyr ................................. 367/6 |
| 5,491,670 A | | 2/1996 | Weber ......................... 367/127 |
| 5,602,343 A | | 2/1997 | Franklin ................... 73/861.29 |
| 5,652,593 A | | 7/1997 | Rench et al. ................ 342/458 |
| 5,783,745 A | | 7/1998 | Bergman .................. 73/170.13 |
| 5,940,346 A | | 8/1999 | Sadowsky et al. .......... 367/128 |
| 6,009,358 A | | 12/1999 | Angott et al. ................. 701/25 |
| 6,157,592 A | | 12/2000 | Kriz et al. ................... 367/127 |
| 6,255,793 B1 | | 7/2001 | Peless et al. ................ 318/580 |

OTHER PUBLICATIONS

Lycos Zone, How Stuff Works, "How Ubiquitous Networking Will Work", Aug. 8, 2001, wysiwyg://82/http://lycos.howstuffworks.com/ubiquitous-network1.htm, pp. 1–3.

Jonathan Dixon and Oliver Henlich, Mobile Robot Navigation, "Macro- to Micro- Scale Navigation", Jun. 10, 1997, http://www.doc.ic.ac.uk/~nd/surprise_97/journal/vol4/jmd/.

* cited by examiner

Primary Examiner—Daniel T. Pihulic
(74) Attorney, Agent, or Firm—Pennie & Edmonds LLP

(57) ABSTRACT

A two-way ultrasonic positioning and navigation system and method involve a plurality of objects each capable of transmitting and receiving ultrasonic signals. A first object transmits an initiating ultrasonic signal and identifies a second object for responding to the initiating ultrasonic signal. The second object transmits a responding ultrasonic signal after a predetermined time delay from receiving the initiating ultrasonic signal. The first objectives the responding ultrasonic signal, and determines a distance between the first object and the second object based on a time period starting at the transmission of the initiating ultrasonic signal and ending at the reception of the responding ultrasonic signal, and on knowledge about the predetermined time delay and other known in advance time delays.

55 Claims, 13 Drawing Sheets

| Platform Transmit Code | Transmitting Faces | Beacon Recipient | Beacon Reply Code |
|---|---|---|---|
| $C_0$ | 1A,1B | $B_0$ | $C_2$ |
| $C_1$ | 2A,2B | $B_0$ | $C_3$ |
| $C_0$ | 1A,1B | $B_1$ | $C_4$ |
| $C_1$ | 2A,2B | $B_1$ | $C_5$ |
| $C_0$ | 1A,1B | $B_2$ | $C_6$ |
| $C_1$ | 2A,2B | $B_2$ | $C_7$ |
| $C_0$ | 1A,1B | $B_3$ | $C_8$ |
| $C_1$ | 2A,2B | $B_3$ | $C_9$ |

Figure 6B

SYSTEM AND METHOD FOR NAVIGATION USING TWO-WAY ULTRASONIC POSITIONING

The present invention relates generally to systems and methods for navigating mobile platforms, and particularly to a beacon-based positioning or navigation system utilizing two-way ultrasonic ranging.

BACKGROUND OF THE INVENTION

The use of ultrasonic ranging in air to position or navigate a mobile object with respect to a set of fixed beacons is widespread nowadays. Many of these systems use time-of-flight measurements of an ultrasonic signal from a transmitter to a receiver. The transmitter can either be located at the mobile object to be positioned, with receivers on beacons placed strategically in the environment, or conversely, transmitters can be placed on the beacons with a receiver located on the mobile object. In some systems, the ultrasonic signal is accompanied by a radio frequency signal, mainly for the purpose of time-synchronization between the transmitter and the receiver. In some other systems, the difference in flight times of an ultrasonic signal and one other signal such as a radio frequency signal is used to determine the distance between the mobile object and each of the beacons. In situations where the mobile object is moving with a significant speed with respect to the beacons, signal frequency Doppler shift of the transmitted ultrasonic signal may be used to aid in the determination of the velocity and position of the mobile object.

In these conventional systems, the distance-measuring accuracy is dependent on the correct determination of the speed of propagation of the ultrasonic signal, i.e., the speed of sound in air. The sound speed in air is dependent on many factors, such as atmospheric temperature, humidity, and wind effect. The use of currently available thermometers and hygrometers makes it very difficult to measure the temperature and humidity along the entire wave path and hence predict the speed of sound along the entire path of an ultrasonic signal. Further, in the presence of a wind current, existing systems are subject to large errors in the calculation of distance and hence large positioning errors. The present invention overcomes these problems of prior art ultrasonic ranging systems.

Additionally, most conventional navigation systems require that the system installer survey the locations of the beacons manually and input the locations into the system. See E. LeMaster and S. Rock, *Self-Calibration of Pseudolite Arrays Using Self-Differencing Transceivers*, Institute of Navigation GPS-99 Conference, Nashville, Tenn., September 1999. Some systems have been classified as self-calibrating, but still require the user to perform certain precise distance measurements. See Mahajan, A. and Figueroa, F., *An Automatic Self Installation & Calibration Method for a 3-D Position Sensing System using Ultrasonics*, Japan-USA Symposium on Flexible Automation, Boston, Jul. 7–10, 1996, pp. 453–460. The present invention also avoids the beacon surveying requirements of prior art systems.

SUMMARY OF THE INVENTION

The system and method of the present invention overcome the aforementioned problems with two-way ultrasonic positioning and navigation that mitigates wind-induced changes in speed of sound. Moreover, the two-way ultrasonic ranging technique obviates the need for time synchronization between platforms. In one embodiment of the present invention, an autonomous or semi-autonomous apparatus, or a mobile platform, is positioned or navigated with respect to a few beacons having fixed positions. Positioning applications involve the localization of the mobile platform using two-way ultrasonic time-of-flight measurements. Navigation applications involve tracking the mobile platform using augmenting sensors based on the position of the mobile platform determined through the two-way ultrasonic time-of-flight measurements.

The method for a two-way ultrasonic measurement, according to one embodiment of the present invention, comprises transmitting an initiating ultrasonic signal from an initiator, the initiating ultrasonic signal identifying an intended recipient, receiving the initiating ultrasonic signal at the intended recipient, transmitting a responding ultrasonic signal from the recipient after a predetermined time delay from the reception of the initiating ultrasonic signal, receiving the responding ultrasonic signal at the initiator, and determining a distance between the initiator and the respondent based on a time period starting at the transmission of the initiating ultrasonic signal and ending at the reception of the responding ultrasonic signal, and on knowledge about the predetermined time delay and the length(s) of the initiating and responding ultrasonic signals. The initiator may be associated with the mobile platform and the respondent with one of the beacons, or vice versa, or the originator and recipient may both be beacons.

A system according to one embodiment of the present invention includes a first set of modules preferably placed on the mobile platform and a second set of modules preferably placed on each of the beacons. The two sets of modules are communicatively coupled through ultrasonic signals and in some embodiments by RF signals also. Each set of modules includes an ultrasonic array coupled to a digital signal processor through an analog/digital converter. The ultrasonic array further includes at least one ultrasonic transceiver or transducer pair for transmitting and receiving ultrasonic signals. The digital signal processor controls the transmission and reception of the ultrasonic signals, including calculating signal arrival time and a figure-of-merit on the quality of a received ultrasonic signal. The first set of modules further includes a central processing unit coupled to the digital signal processor for implementing a position algorithm for determining the position of the mobile platform based on the two-way ultrasonic time-of-flight measurements.

The system can be self-calibrating to eliminate the need for manual survey equipment for determining the positions of the beacons. A method for self-calibrating the locations of the plurality of beacons comprises the steps of: (1) determining a set of inter-beacon distances using inter-beacon ultrasonic measurements; (2) setting a first beacon at an origin of a coordinate system; (3) setting a second beacon on one axis of the coordinate system and determining the coordinates of the second beacon based on the distance between the first beacon and the second beacon; (4) determining the coordinates of a third beacon based on the distances between the first beacon and the second beacon, between the second beacon and the third beacon, and between the third beacon and the first beacon, and based on a predetermined constraint on the location of the third beacon; and (5) iteratively improving the determined locations of the plurality of beacons.

BRIEF DESCRIPTION OF THE DRAWINGS

FIG. 6B is a table for aiding in the illustration of FIG. 6A.

DETAILED DESCRIPTION OF THE PREFERRED EMBODIMENTS

Figure 1:
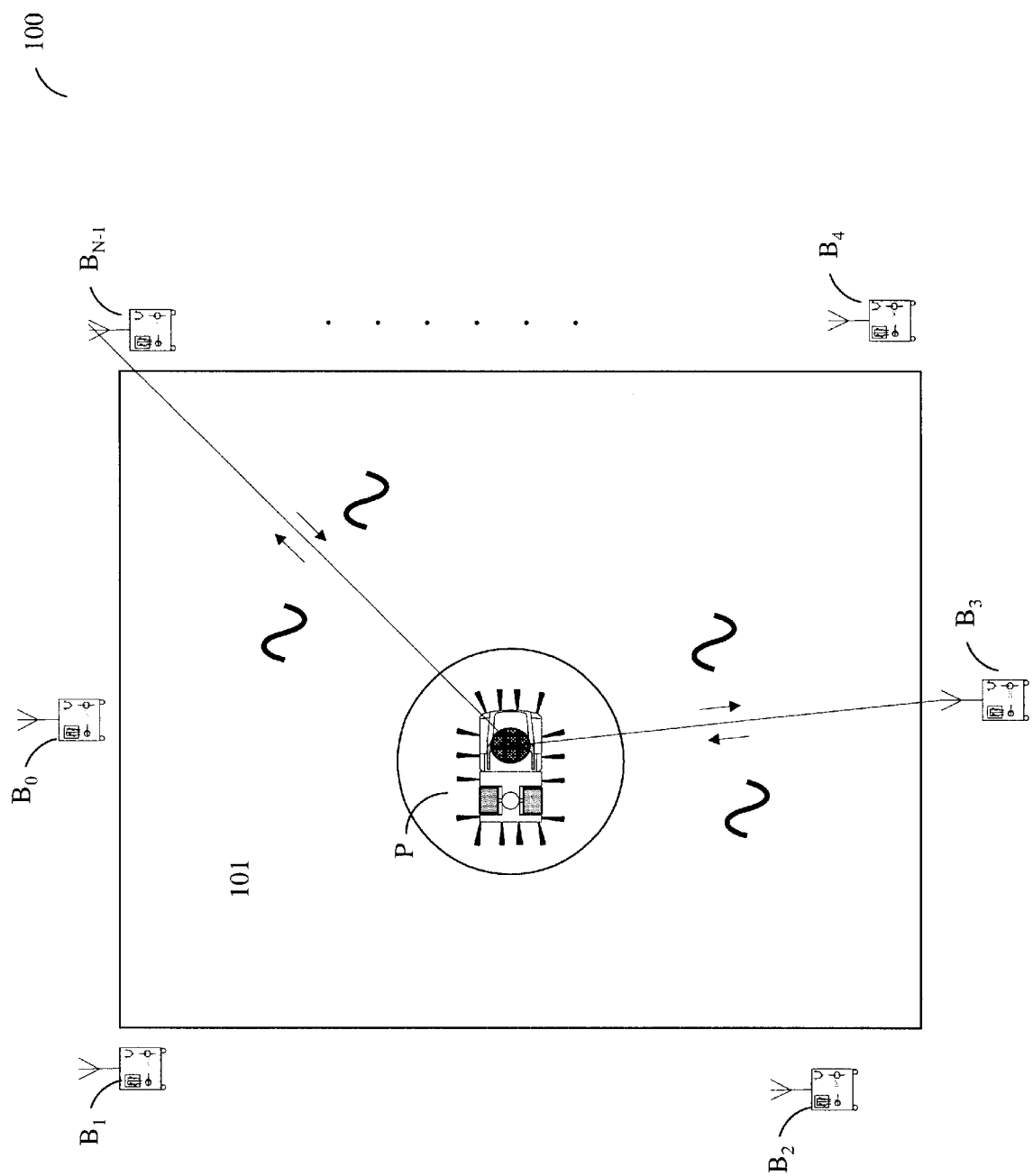
FIG. 1 is a block diagram of an overview of the two-way ultrasonic ranging system according to a preferred embodiment of the present invention.

FIG. 1 is block diagram of an overview of a two-way ultrasonic positioning and navigation system 100 in accordance with one embodiment of the present invention. The system 100 includes a mobile platform P, and a number of beacons $B_0, B_1, \ldots,$ and $B_{N-1}$, where N is an integer larger than one (i.e., at least two), and is preferably greater than two. The beacons $B_0, B_1, \ldots,$ and $B_{N-1}$ may be placed at surveyed locations. Alternately, the beacons can be placed at arbitrary positions, which are automatically determined without user input during an initial system self-calibration procedure, described in more detail below. The system 100 performs two-way ultrasonic time-of-flight measurements to position or track the mobile platform P within a predetermined geographical range or service volume 101.

Figure 7:
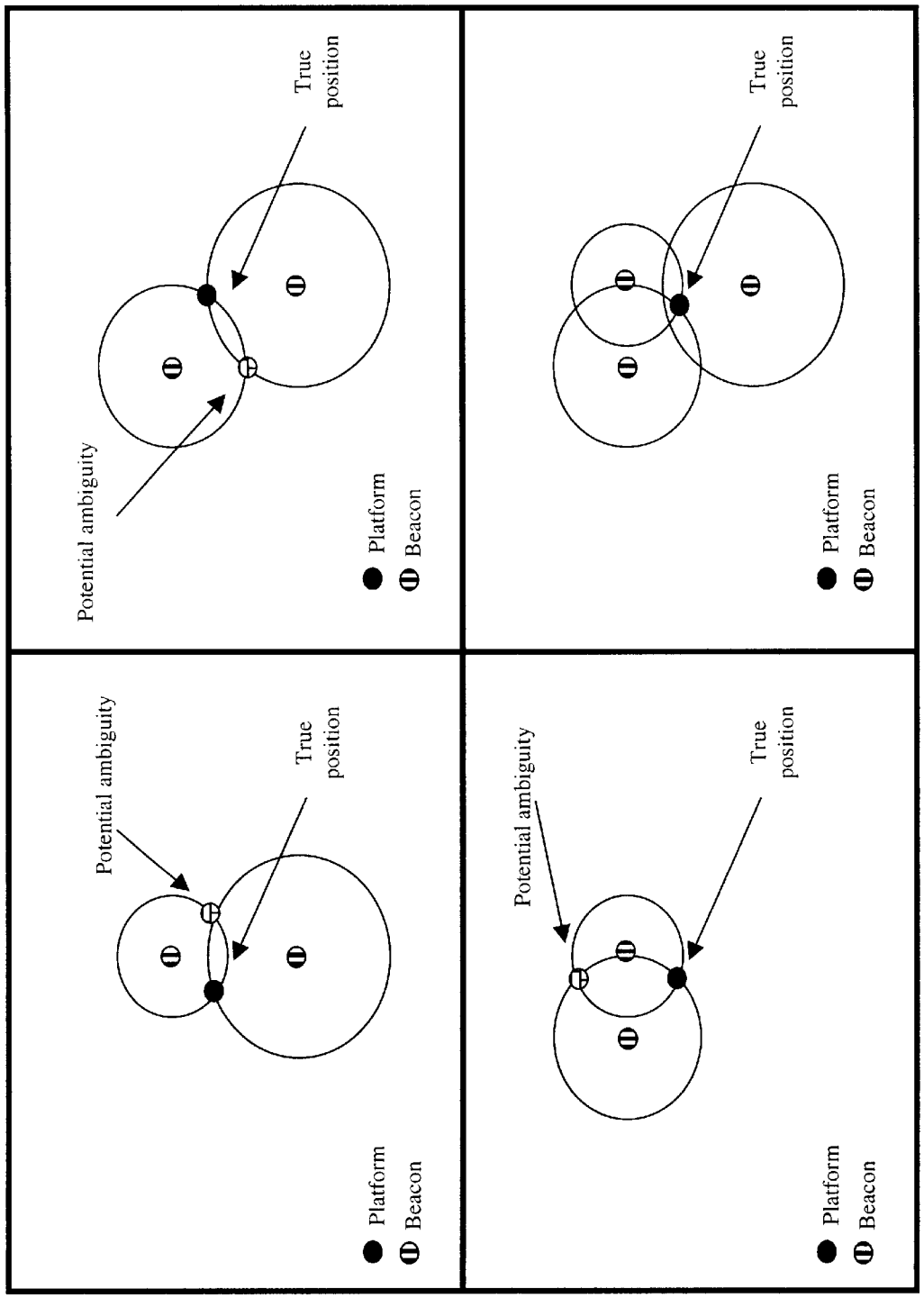
FIG. 7 is a diagram illustrating possible positioning ambiguity resulting from two few a number of beacons.

The number N of beacons $B_0, B_1, \ldots,$ and $B_{N-1}$ should be adequate to provide accurate positioning of the mobile platform P throughout the geographical range 101. In a two-dimensional (2D) implementation, assuming the ultrasonic signal propagation speed is known, the minimum number of beacons necessary for the positioning or navigation of the mobile platform P is two. However, this may result in an ambiguity that is difficult to resolve. Hence, typically, the minimum number of beacons for a two-dimensional implementation is three when the beacons are placed in a non-collinear fashion. This idea is illustrated in FIG. 7. Similarly, for a three-dimensional (3D) positioning or navigation system, the minimum number of beacons necessary is three, again with a geometric ambiguity that may be difficult to resolved without additional knowledge or the use of a fourth (non-coplanar) beacon. In cases where the propagation speed of sound is not known precisely and is solved by using platform-to-beacon measurement results, the minimum number of beacons is four for 2D positioning/navigation systems, and is five for 3D positioning/navigation systems, respectively. In one embodiment of the present invention, beason-to-beacon measurements (as explained in more detail below) are used to calculate the speed of sound. The beacons are preferably at fixed locations so that changes in the inter-becon measurements are a consequence of the changes in the speed of sound in air. This measurements can be performed periodically (e.g. every 5 minutes) to update the speed of sound used by the positioning or navigation system.

Additionally, as a practical matter, in order to provide good accuracy one needs to ensure that the beacons are positioned to provide good geometry to facilitate an accurate position solution, increasing the requirements on the number of beacons. See Ray, P. K. and Mahajan, A., "Genetic Algorithms to obtain Optimal Location of Receivers in an Ultrasonic Position Estimation System," Submitted to *Robotics and Autonomous Systems,* January 2001. Also, additional beacons may be included on top of the number deemed necessary for accuracy in order to provide system integrity and robustness against erroneous measurements or faulty equipment. If any of the beacons are not visible throughout the entire environment 101, more must be added to ensure that positioning accuracy is not degraded in any portions of the service volume 101.

Figure 1A:
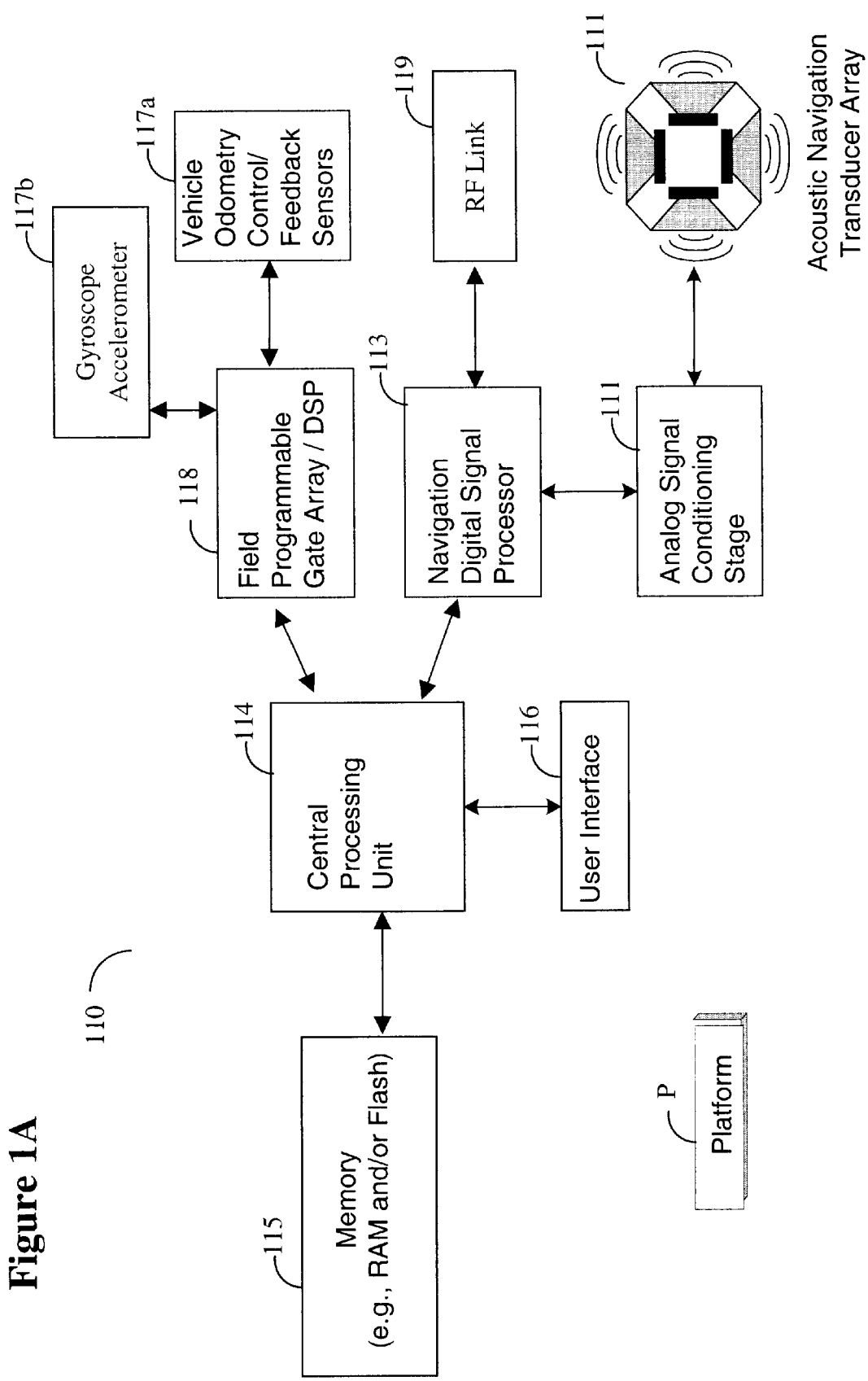
FIG. 1A is a block diagram illustrating a first set of modules of the two-way ultrasonic ranging system in accordance with an embodiment of the present invention.

FIG. 1A is a block diagram illustrating a first set of modules 110 of the system 100 in accordance with an embodiment of the present invention. The first set of modules 110 is preferably placed on the mobile platform ("platform") P, and includes an ultrasonic array ("array") 111 for transmitting and receiving ultrasonic signals. The first set of modules 110 also preferably includes an analog to digital signal converter (ADC) 112 coupled to the ultrasonic array 111 having one or more acoustic transducers or transceivers, a digital signal processor 113 coupled to the analog to digital converter 112, and a central processing unit (CPU) 114 coupled to the digital signal processor 113. The first set of modules further includes a memory unit 115 coupled to the CPU 114, and a user interface 116 also coupled to the CPU 114. When the system 100 is used to navigate the platform P, the first set of modules 110 further includes a vehicle odometry control and feedback sensor 117a, and a field programmable gate array (or DSP) 118 coupled between the sensor 117a and the CPU 114. The first set of modules 110 may further comprise a radio frequency data communication link 119 coupled to the digital signal processor 113 for communicating with the beacons using radio frequency signals, as explained in more detail below. The first set of modules 110 may further include augmentation navigation sensors 117b, such as one or more gyroscopes and accelerometers, for obtaining information in order to accurately model the movement of the mobil platform P.

Figure 1B:
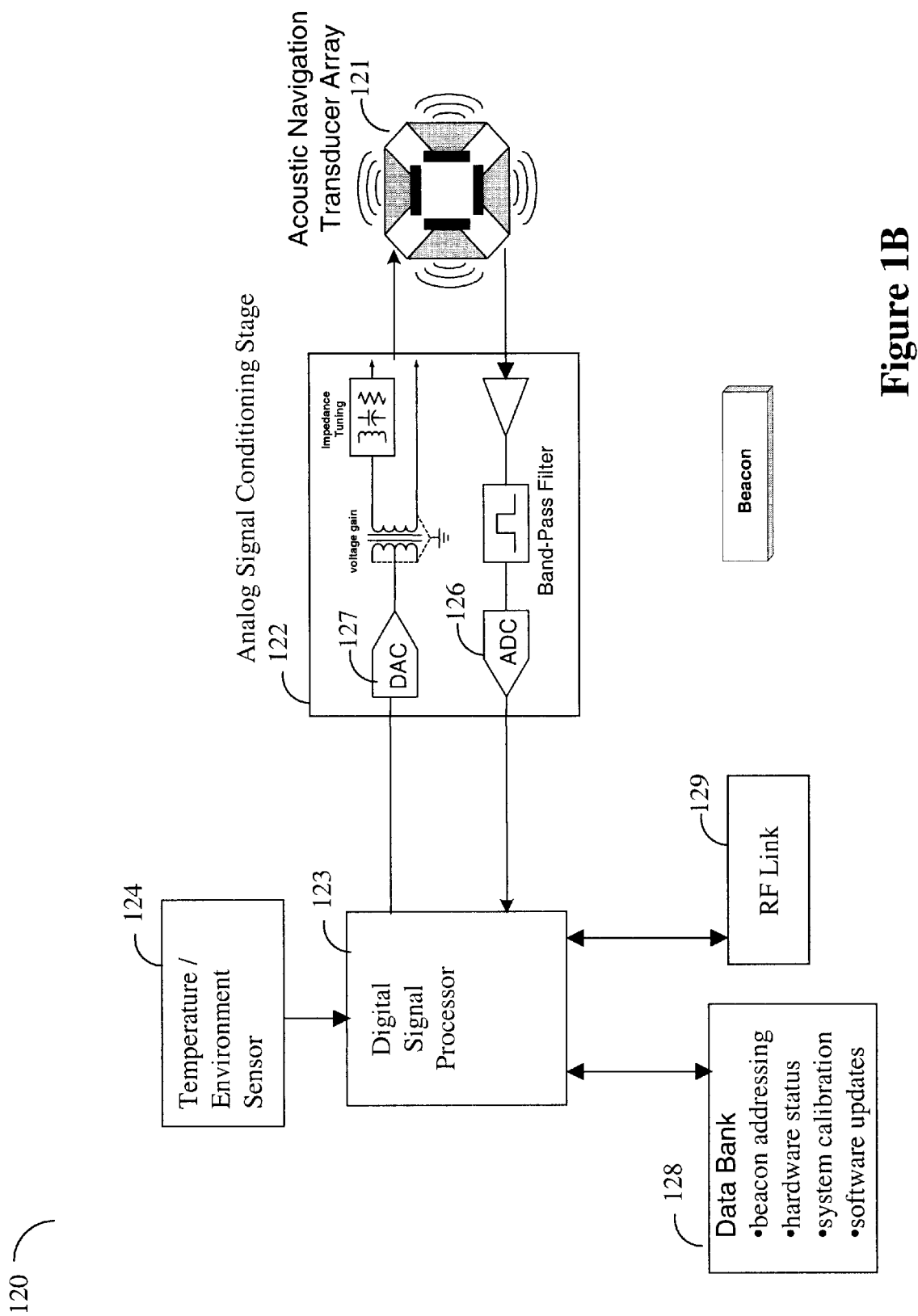
FIG. 1B is a block diagram illustrating a second set of modules of the two-way ultrasonic ranging system in accordance with an embodiment of the present invention.

FIG. 1B is a block diagram illustrating a second set of modules 120 of the system 100 in accordance with an embodiment of the present invention. The second set of modules 120 is preferably placed on each of the N beacons $B_0, B_1, \ldots,$ and $B_{N-1}$, and includes an ultrasonic array 121 having one or more acoustic transducers or transceivers for transmitting and receiving ultrasonic signals. The acoustic transducers or transceivers of the ultrasonic array 121 are coupled to a digital signal processor (DSP) 123 by an analog signal conditioning circuit 122. In an embodiment of the present invention where the speed of sound in air is determined by the system 100, as explained in more detail below, the second set of modules 120 further includes a temperature and/or relative humidity sensor 124 coupled to the DSP 123. The second set of modules 120 may further include a memory or data bank 128 and a radio frequency data communication link 129 also coupled to the digital signal processor 123 for communicating with the platform P and/or other beacons using radio frequency signals.

The analog signal conditioning circuit 112 or 122 converts digital signal into analog signals and conditions the resulting analog signal for transmission by the ultrasonic array 111 or 121, respectively. The analog signal conditioning circuit 112 or 122 also conditions and converts analog signals received from the ultrasonic array 111 or 121, respectively, into digital signals for processing by the DSP 113 or 123, respectively.

Figure 1C:
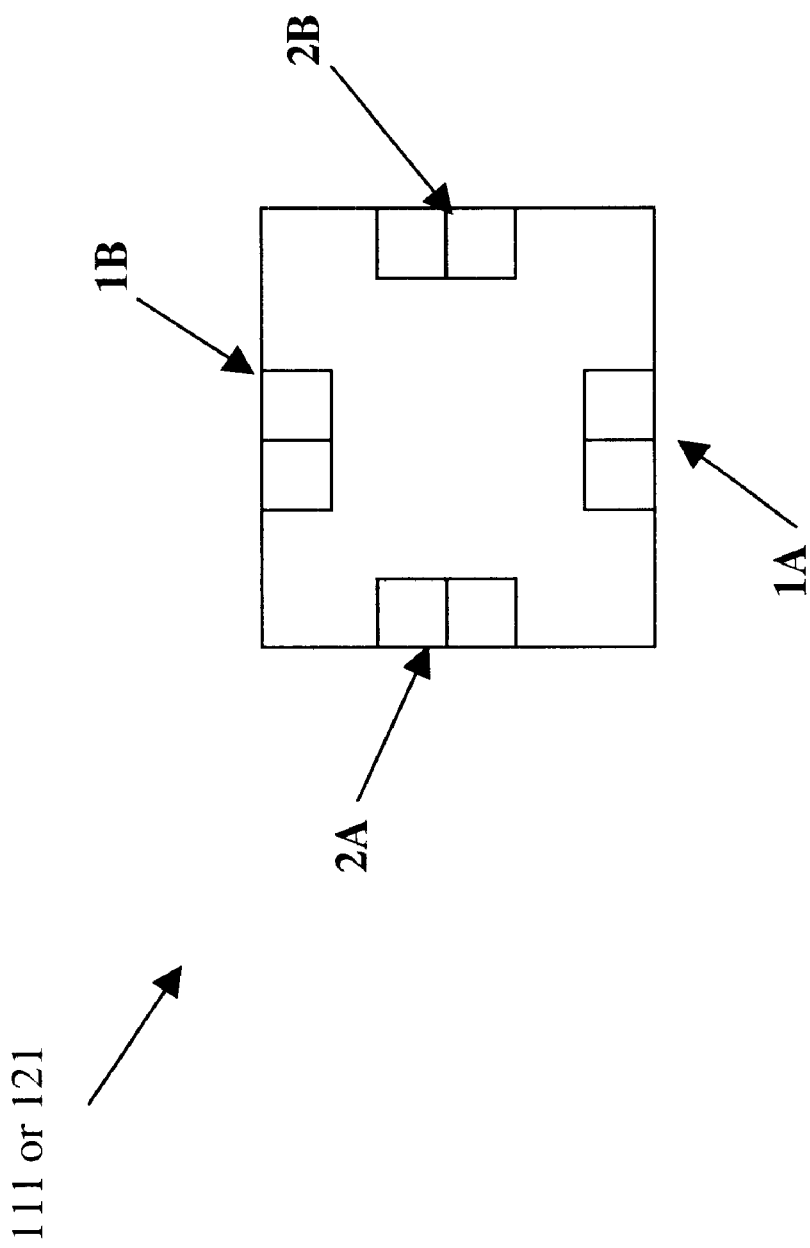
FIG. 1C is a block diagram illustrating of an ultrasonic array according to an embodiment of the present invention.

FIG. 1C is a block diagram illustrating the ultrasonic array 111 or 121 (of the mobile system 110 or a beacon 120) according to one embodiment of the present invention. The ultrasonic array 111 or 121 consists of one or more ultrasonic transducers. There may be separate transducers for transmission and reception, or the transducers can be operated as transceivers. In FIG. 1C, the ultrasonic array 111 or 121 includes four transceivers or transducer pairs, 1A, 1B, 2A and 2B, where 1A and 1B are placed back-to-back with each other, and 2A and 2B are placed back-to-back with each other and orthogonal to 1A and 1B, so that the four transducer pairs are facing four different horizontal directions. FIG. 1C only shows one of many possible configurations for the ultrasonic array 111 and 121, as the ultrasonic array 111 and 121 may include more or less transceivers or transducers that may be configured differently for different applications.

In many cases, an originator of an ultrasonic signal, which can be the platform or a beacon, does not possess knowledge of the relative direction of an intended recipient for the ultrasonic signal, and therefore does not know which transceiver or transducer to use to send the ultrasonic signal. One way of making sure that the ultrasonic signal will be received by the intended receipient is to broadcast out of all of the transducer pairs in the array 111 or 121. When transmitting from multiple transducers in an array simultaneously, care needs to be taken to ensure that sufficient transducer beam separation exists to avoid signal-cancellation effects. As a result, often more than one measurement cycles are required. In a preferred embodiment of the present invention, the ultrasonic signal is broadcast from transceiver pair 1A and 1B at one time, and then broadcast from transceiver 2A and 2B at a later time.

In some applications, the originator of the ultrasonic signal has rough knowledge about its location relative to the intended recipient array and thus will have knowledge of the optimal transducer(s) to transmit from in order to ensure successful link closure.

The transducers in the array 111 or 121 are coupled with the digital signal processor 113 or 123, through the analog signal conditioning circuits 112 or 122, respectively. The analog signal conditioning circuits 122 includes an analog to digital converter (ADC) 126 that converts any received signal to digital form for use by the digital signal processor 123. Circuits 122 also includes a digital to analog converter 127 for converting digital signals into analog signals to be sent to the transducer pairs in the ultrasonic array 121. Circuits 112 is configured similarly. The digital signal processor 113 or 123 is capable of controlling signal transmission and reception, including calculating signal arrival times and a figure-of-merit on the quality of each received signal. The digital signal processor 113 is further coupled to a CPU 114 that implements a positioning/navigation algorithm as described below.

Figure 2:
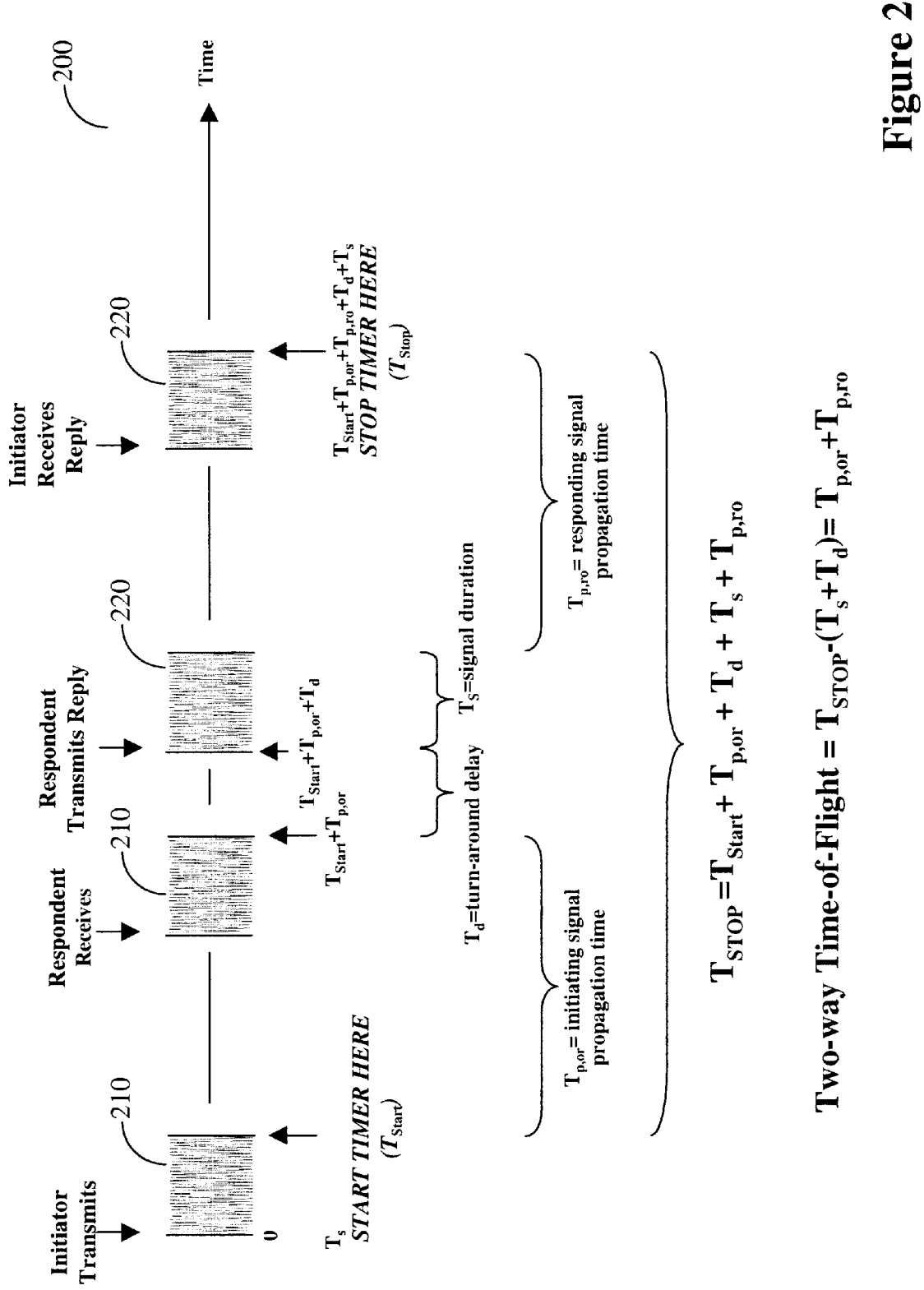
FIG. 2 is a time chart for a pair of initiating and responding ultrasonic signals according to an embodiment of the present invention.

FIG. 2 illustrates a 2-way time-of-flight measurement cycle 200 between an initiator and a respondent, according to one embodiment of the present invention. For ease of discussion, the initiator is assumed to be the platform P and the respondent is assumed to be one of the beacons, such as $B_0$. However, only slight modification of the following discussion is needed if the initiator is one of the beacons and the respondent is the platform P or another beacon. In the 2-way time-of flight measurement cycle 200, as shown in FIG. 2, the platform P transmits at least one initiating ultrasonic signal 210 having a signal duration $T_s$ at time 0. Commensurate with the transmission of the ultrasonic signal 210, the platform P starts a timer at time $T_{start}=T_s$. Assuming the beacon $B_0$ successfully receives the ultrasonic signal 210 at time $T_{p,or}$, the beacon $B_0$ will, after a short fixed time delay $T_d$, respond back to the platform P by transmitting at least one responding ultrasonic signal 220 toward the platform P. The responding ultrasonic signal 220 may have the same or a different signal duration as the initiating ultrasonic signal 210. When multiple distinguishable ultrasonic signals are received by the same beacon at approximately the same time, the beacon internally computes a figure-of-merit for each received signal, determines which received signal has the largest figure of merit, and responds only to the received signal with the largest internally calculated figure-of-merit. Determining a figure-of-merit is discussed in more detail below. In one embodiment of the present invention, the ultrasonic array 121 on the beacon $B_0$ include multiple transceiver or transducer pairs, and one transceiver or transducer on the beacon will detect a signal before the others. The beacon $B_0$ will respond back to only the first arrival of an initiating ultrasonic signal, to mitigate effects of signal multipath. A signal multipath is caused by the ultrasonic signal hitting another object(s) and being reflected from that object(s) to the beacon $B_0$.

Assuming that the responding ultrasonic signal 220 is successfully detected at the platform P, the timer reading ($T_{STOP}$) at the signal time-of-arrival is noted. The two-way time-of-flight can be calculated by subtracting from $T_{STOP}$ the fixed time delay, the signal duration(s) and other (known in advance) processing delays. The two-way time-of-flight measurements are converted to a distance between the platform and the beacon $B_0$ by halving the two-way time-of-flight and multiplying the resulting time-of-flight by the speed of sound in air. Typically, the above process repeats, whereby the platform P will, in turn, communicate with each of the other beacons in-view. In a further embodiment of this invention, the platform may at times signal to multiple beacons, as explained in more detail below. In this case, special care is taken to ensure that the initiating or responding ultrasonic signals do not cause excessive self-interference (which would prevent successful signal receptions), either at any beacons $B_0, B_1, \ldots,$ and $B_{N-1}$ or at the platform P.

The one-way time-of-flight measurement between the platform P and one of the beacons, such as $B_0$, located respectively at $(x_0, y_0, z_0)$ and $(x_r, y_r, z_r)$, is given by:

$$tof_{or} = \frac{d_{or}}{c_{or}} = \frac{1}{c_{or}}\sqrt{(x_o - x_r)^2 + (y_o - y_r) + (z_o - z_r)^2}$$

where $c_{or}$ represents the average speed of sound along the path from the platform P to the beacon $B_0$ and $d_{or}$ is the distance from the platform P to the beacon $B_0$. The above expression assumes a three-dimensional application. In cases where the platform and all of the beacons are located in the same plane or approximately the same plane, the third coordinate z can be disregarded. Similarly, the one-way time-of-flight measurement from the beacon $B_0$ to the platform P is given by:

$$tof_{ro} = \frac{d_{ro}}{c_{ro}}$$

where $d_{ro}=d_{or}$ if the platform P is stationary or slow-moving, i.e., its speed is much smaller than the speed of sound in air. In the above expression, $c_{ro}$ represents the average speed of sound along the path from the beacon $B_0$ to the platform P. The speed of sound in air can be calculated based readings from environmental sensors and known analytic expressions, or determined from the 2-way time-of-flight measurements 200 among beacons or between the platform and beacons, or a combination of both.

Figure 3:
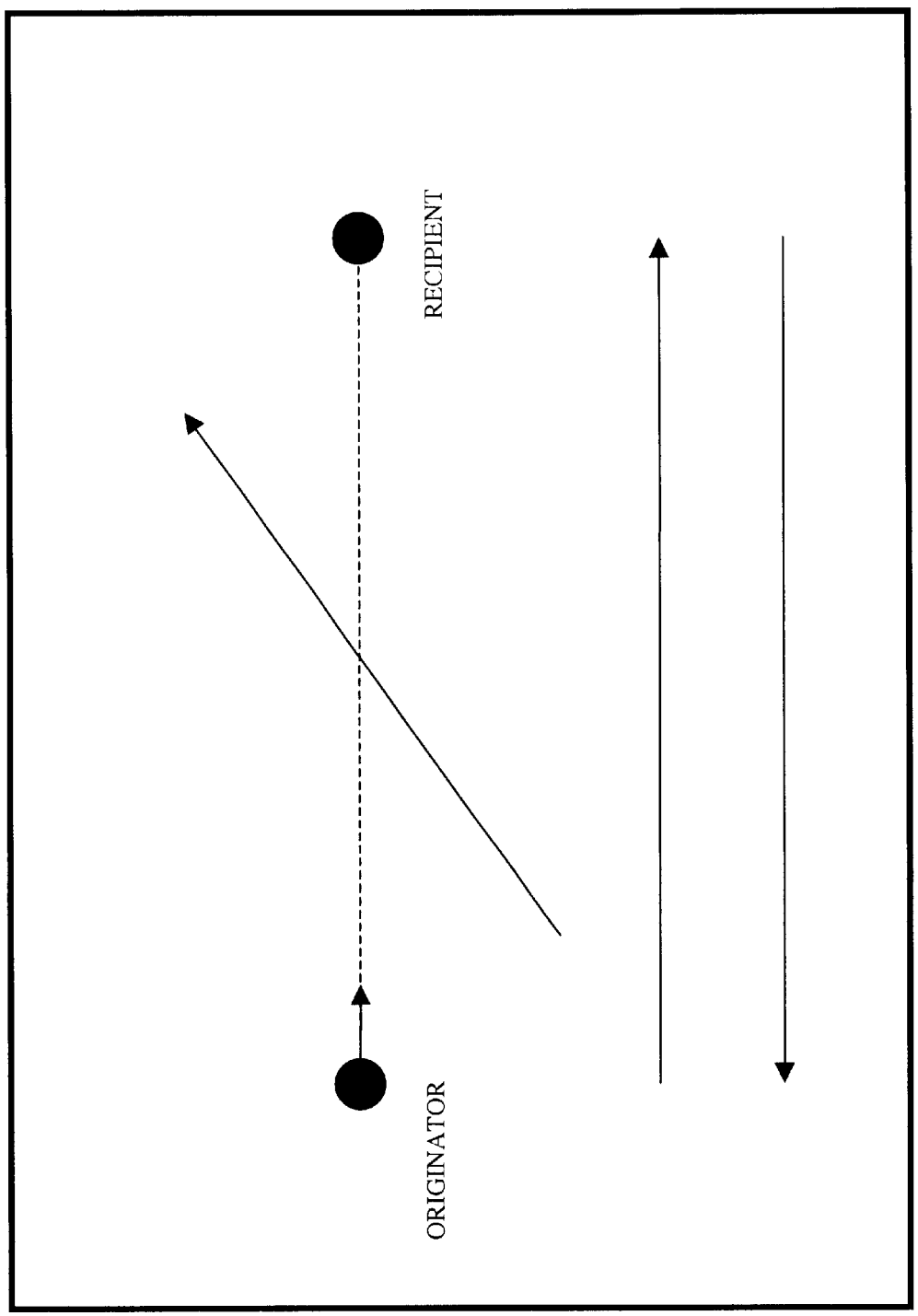
FIG. 3 is a vector diagram illustrating a direction of wind with respect to directions of the initiating and responding ultrasonic signals.

Wind effects on the speed of sound are made less significant by using the two-way ultrasonic positioning/navigation system 100, as explained below. The speed of sound in air to a first-order approximation is given by the following expression:

$$c = c_0 \sqrt{1 + \frac{T}{273}} + \vec{e}^T \cdot \vec{w},$$

as stated in the literature by H. Wehn and P. Belanger, "Ultrasound-Based Robot Position Estimation," IEEE Transactions on Robotics and Estimation, Vol. 13, No. 5, October 1997. In the above equation, c is the speed of sound in the direction $\vec{e}$ (which is a unit vector), T is the atmospheric temperature in Celsius, $\vec{w}$ is a wind velocity vector, and $c_0$ is the speed of sound at temperature 0° C. (which is approximately 331.45 m/s). If $$v = |\vec{e}^T \cdot \vec{w}|$$

is the magnitude of the wind velocity along $\vec{e}$, and $$\hat{c} = c_0 \sqrt{1 + \frac{T}{273}}$$

is the nominal speed of sound, then the speed of sound in the two opposite directions along $\vec{e}$ are given by $\hat{c}+v$ and $\hat{c}-v$, as illustrated in FIG. 3. The two respective one-way measurements should produce, $$tof_+ = \frac{d}{\hat{c}+v} = \frac{d}{\hat{c}}\left(\frac{1}{1+v/\hat{c}}\right) = \frac{d}{\hat{c}} + O((v/\hat{c})), \text{ and}$$

$$tof_- = \frac{d}{\hat{c}-v} = \frac{d}{\hat{c}}\left(\frac{1}{1-v/\hat{c}}\right) = \frac{d}{\hat{c}} + O((v/\hat{c})).$$

Thus, the timing error due to wind effects in a one-way system is proportional to $v/\hat{c}$, with the two one-way time-of-flight measurements in the system 100, $$tof_{+-} = \frac{1}{2}\left(\frac{d}{\hat{c}+v} + \frac{d}{\hat{c}-v}\right) = \frac{d}{2}\left(\frac{2\hat{c}}{\hat{c}^2-v^2}\right)$$

$$= \frac{d}{\hat{c}}\left(\frac{\hat{c}^2}{\hat{c}^2-v^2}\right) = \frac{d}{\hat{c}}\left(\frac{1}{1-(v/\hat{c})^2}\right) = \frac{d}{\hat{c}} + O((v/\hat{c})^2)$$

where the term $O((v/\hat{c})^2)$ represents the timing error resulting from the wind effects and it signifies that the error is proportional to $(v/\hat{c})^2$. Thus, the timing error in the two-way system 100 is proportional to $(v/\hat{c})^2$. Because, under normal conditions, $v<<\hat{c}$, the two-way paradigm, represents a significant improvement in positioning accuracy and hence provide the foundation for an improved ranging and positioning system. An example illustrating this advantage is as follows:

$\hat{c}$=331.45 m/s (nominal sound speed, neglecting wind)

v=10 m/s (magnitude of wind velocity along path)

d=20 m (actual distance)

$$d_\pm = \hat{c} \times tof_\pm = 331.45 \times \frac{1}{2}\left(\frac{20}{331.45+10} + \frac{20}{331.45-10}\right)$$

$$= 20.0182 \text{ m}$$

$$d_+ = \hat{c} \times tof_+ = 331.45 \times \left(\frac{20}{331.45+10}\right) = 19.4143 \text{ m}$$

$$d_- = \hat{c} \times tof_- = 331.45 \times \left(\frac{20}{331.45-10}\right) = 20.622 \text{ m}$$

Clearly, the two-way measured distance $d_{+-}$ is more accurate than either the one-way measured distance $d_+$ along the blow of the wind or one-way measured distance $d_-$ against the blow of the wind. This example assumes that the platform P remains stationary or is slow moving during the two-way measurement cycle, so that the geometry between the beacon and the platform remains roughly constant over a fraction of a second in practical applications to make this approach effective. For faster moving mobil platforms, the movement during the measurement cycle needs to be modeled as part of the navigation algorithm.

In one embodiment of the present invention, the system 100 includes multiple beacons, and each ultrasonic signal has only one intended recipient. In order to facilitate this mode of operation, the ultrasonic signals are coded using, for example, signal modulation. At least one unique code is associated with each beacon and, in some cases, with the platform itself. Well-known modulation techniques include frequency shift keying, phase shift keying or pulse positioning (on-off keying). The ultrasonic transducers/transceivers and associated tuning circuitry are configured to provide adequate bandwidth to support the signal design. In a preferred embodiment, the ultrasonic signal is coded with information using binary phase shift keying (BPSK). In particular, two basis functions are defined as:

$s_1(t)=\cos(\omega t)$  $0 \leq t \leq T_c$ $s_2(t)=\cos(\omega t+\pi)=-s_1(t)$ Because of the antipodal relationship between these two functions, only a single basis function is necessary in practice. The form of the transmitted signal is:

$$s(t) = \sum_{p=0}^{N-1} g_p s_1(t - pT_c) U(t - pT_c) \quad 0 \le t \le NT_c$$

$$U(\tau) = \begin{cases} 1 & 0 \le \tau \le T_c \\ 0 & \text{otherwise} \end{cases}$$

Thus, the total pulse duration is the product $NT_c$, where N is the length of the binary sequence $\{g_p\}$ and $T_c$ is the duration of each chip (i.e., each item in the binary sequence). In the above expression, the sequence $\{g_p\}$ is chosen to provide good signal correlation properties as is well known to those skilled in the art of signal processing. As an example, Gold Codes of length 127 have been utilized for this purpose. These codes provide good autocorrelation properties for time-of-flight detection as well as low cross-correlations among different signal sequences, and facilitate unique identification of signal recipients. A sampled matched filter has been implemented in the analog signal conditioning circuits 112/122 for the purposes of real-time signal detection. The output value of the matched filter is compared to a threshold to detect signal arrival and the precise time-of-arrival is computed by finding a local maximum value of the matched filter output over a short interval following the initial threshold crossing. Also, the maximum value of the corresponding matched filter can be used as a signal detection figure-of-merit for descriminating between simultaneous arrivals (in different array faces) and/or computing an expected measurement error. Mathematically, the resulting signal form the sampled matched filter is:

$$z[m] = \sum_{p=0}^{N-1} g_p \sum_{k=0}^{N_c-1} c[k] r[m + (p-N)N_c + k + 1]$$

where,
m=1, 2, 3, . . .
$\Delta t$=sample time interval
$N_c$=# samples per chip=$T_c/\Delta t$
r[m]=sampled received signal=r((m−1)$\Delta t$), r(t)=0 for t<0
c[k]=cos($\omega$(k−1)$\Delta t$)
z[m]=sampled matched filter output at t=(m−1)$\Delta t$.

Figure 4:
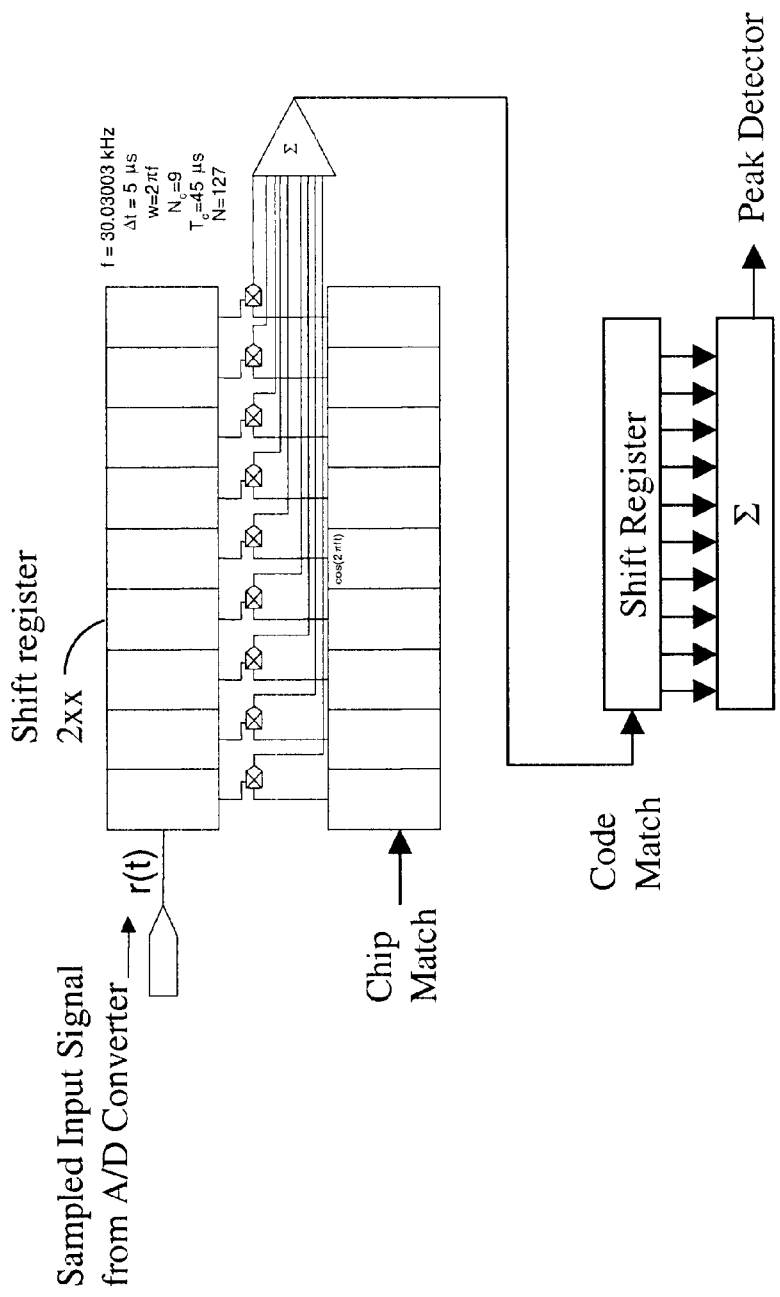
FIG. 4 is block diagram of a decoder for decoding an encoded ultrasonic signal.

A block diagram illustrating a correlator circuit for detecting an input signal is shown in FIG. 4. If no gain control is utilized in the analog/digital converter 112/122 or the signal is not hard-limited, the amplitude of the matched filter output may scale with the amplitude of the received signal. To mitigate this effect, the algorithm can be slightly modified to normalize the matched filter output by the autocorrelations of the received and ideal signals, $$z[m] = \frac{\sum_{p=0}^{N-1} g_p \sum_{k=0}^{N_c-1} c[k] r[m + (p-N)N_c + k + 1]}{\left(N \sum_{j=0}^{N_c-1} c[j]^2\right)^{1/2} \left(\sum_{j=0}^{NN_c-1} r[m-j]^2\right)^{1/2}}$$

The number of identification codes assigned to each ultrasonic array 111 or 121 depends on the number and orientation of the transducers in the array, and more generally on the array architecture and how the transducers are used. In one embodiment, each array 111 or 121 includes four faces each having a transducer pair (see FIG. 1C). Transmitted ultrasonic beam patterns from neighboring faces overlap, and two distinct device identification codes are associated with each ultrasonic array (beacon or the platform). Each transmitted signal specifies via the code the intended recipient so that each ultrasonic array listens for only those codes unique to itself. When responding to a detected signal, the array will in turn respond back with a corresponding code, also unique to itself. The use of unique codes helps avoid false detections. In another embodiment of this invention, the intended recipient of a transmitted signal are communicated using a RF signal accompanying the ultrasonic signal.

Because the transmitted ultrasonic beam patterns of neighboring transducers overlap, simultaneous transmission from adjacent transducers is not preferred due to possible signal cancellation effects resulting from differences in signal phases. Thus, only transducers on opposing faces of the ultrasonic array (or a "transmitting pair")are allowed to transmit simultaneously. Each pair of opposing transducers in a ultrasonic array is assigned a distinct code, and at least two distinct codes are assigned to each ultrasonic array to allow for the identification of each of the two transducer pairs of the array. At the initiator of a measurement cycle, typically no information is available to the initiator concerning which face (or face-pair) is optimally aligned with a desired recipient, and therefore the initiator transmits a sequence of signals from each transmitting pair of the initiator's ultrasonic array. Furthermore, each signal in the sequence of transmitted signals is encoded with a different one of the identification codes associated with the intended recipient. In some cases, each signal may also include the code associated with the transmitting pair that transmits the signal. The intended recipient responds only to a first reception of a coded signal that is above the detection threshold to minimize the effect of multipath transmission of the transmitted signals, because in many cases it is possible for a multipath signal to possess larger signal energy than the direct path signal. By processing only the first coded signal to be received that is above the detection threshold, the system ignores (and thus effectively filters out) multipath signals that travel by indirect paths from the transmitting device to the recipient device.

At the recipient, receive channels from different array faces are processed independently but in parallel. When multiple signals arrive closely in time, the device responds to the signal received from the face having the best reception (e.g., the face with the largest correlation value or figure of merit).

Figure 5:
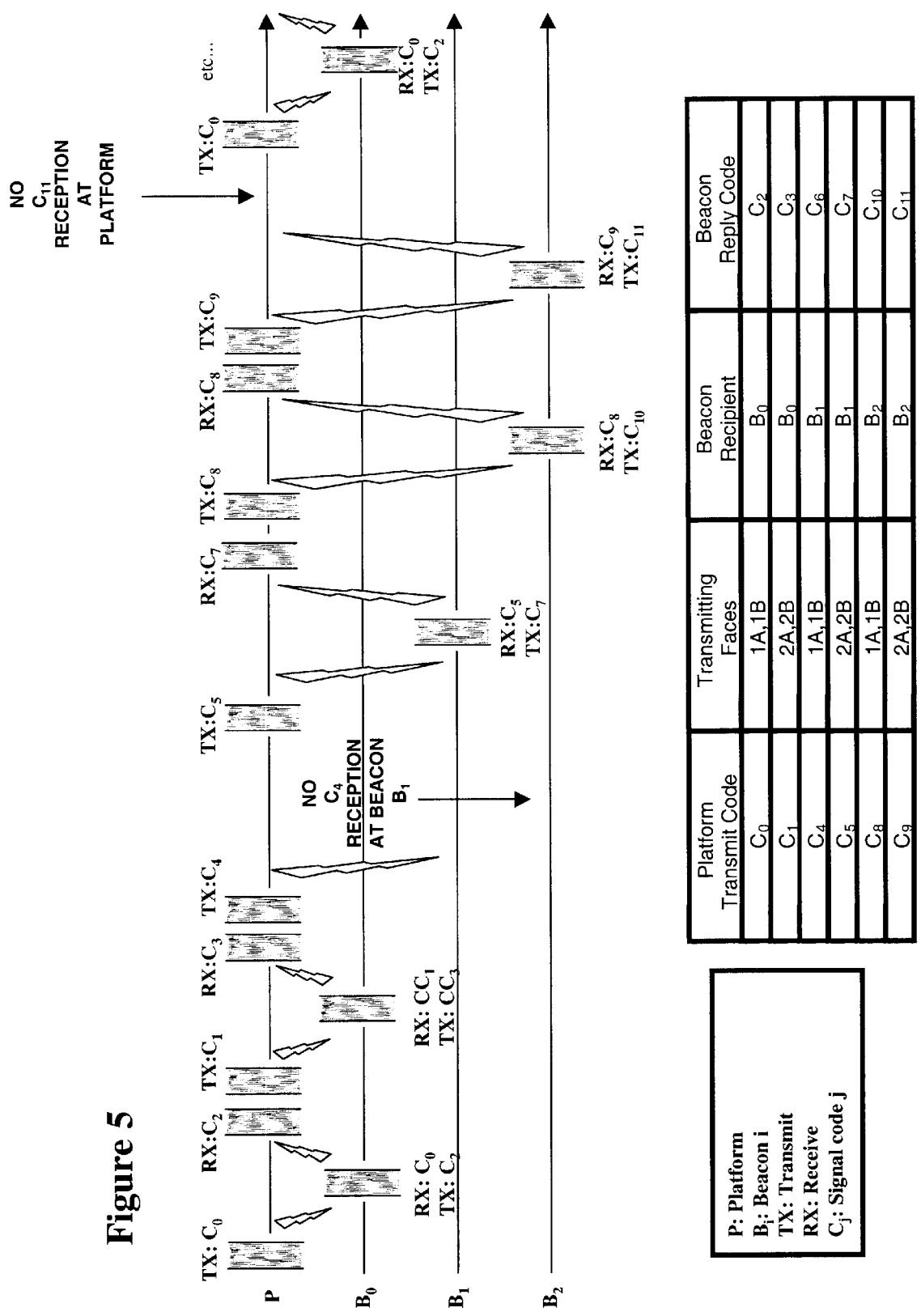
FIG. 5 is a time chart illustrating transmission and reception times for a set of ultrasonic signals between a mobile platform and a group of beacons in accordance with an embodiment of the present invention.

In one embodiment of the present invention, the platform P polls the beacons $B_0, B_1, \ldots,$ and $B_N$ in turn to determine its position with respect to the beacons $B_0, B_1, \ldots,$ and $B_{N-1}$. A polling scheme involving a platform P and three beacons $B_0, B_1,$ and $B_2$ according to one embodiment of the present invention is illustrated in FIG. 5. In this polling scheme, each beacon is signaled twice in succession from the two transmitting pairs in the array 111 positioned on the platform P. As shown in FIG. 5, the platform P transmits ("TX:$C_0$"), from transmitting pair 1A, 1B, an initiating ultrasonic signal with signal code $C_0$ identifying beacon $B_0$. This signal is received and recognized ("RX:$C_0$") by beacon $B_0$, and in response, beacon $B_0$ transmits a responding ultrasonic signal coded with signal code $C_2$ after a predetermined time delay from receiving the signal $C_0$, as illustrated in FIG. 2. The responding ultrasonic signal $C_2$ is preferably transmitted from the same transceiver of the array 121 that received the signal $C_0$. This signal is received and recognized by the platform P ("RX:$C_2$"). Shortly thereafter, the platform P transmits, from transmitting pair 2A, 2B, another initiating ultrasonic signal with signal code $C_1$ also identifying beacon $B_0$. The signal $C_1$ is also received and recognized by the beacon $B_0$, and in response, beacon $B_0$ transmits another responding ultrasonic signal coded $C_3$ after the predetermined time delay from receiving the signal $C_1$, as illustrated in FIG. 2. The responding signal $C_3$ is preferably transmitted from the same transceiver or transducer pair of the array 121 that received the signal $C_1$. This signal is received and recognized by the platform P ("RX:$C_3$").

The platform P continues to poll the other beacons using the same process. Some signals may not be received by the intended recipient. For example, as shown in FIG. 5, the platform P transmits an initiating ultrasonic signal with signal code $C_4$ identifying beacon $B_1$. This signal, which is transmitted by transmitting pair 1A, 1B, is not received by beacon $B_1$. The platform P then transmits another initiating ultrasonic signal with signal code $C_5$ also identifying beacon $B_1$, this time from transmitting pairs 2A and 2B. The signal $C_5$ is received and recognized by the beacon $B_1$ ("RX:$C_5$"), and in response, beacon $B_1$ transmits a responding ultrasonic signal coded $C_7$ after the predetermined time delay from receiving the signal $C_5$, as illustrated in FIG. 2. The responding signal $C_7$ is preferably transmitted from the same transceiver or transducer pair of the array 121 that received the signal $C_5$. This signal is received and recognized by the platform P ("RX:$C_7$").

Still referring to FIG. 5, the platform P continues to transmit an initiating ultrasonic signal with signal code $C_8$ identifying beacon $B_2$. The ultrasonic signal with signal code $C_8$ is transmitted by platform P from transmitting pair 1A, 1B. This signal is received and recognized ("RX:$C_8$") by beacon $B_2$, and in response, beacon $B_2$ transmits a responding ultrasonic signal coded with signal code $C_{10}$ after a predetermined time delay from receiving the signal $C_8$, as illustrated in FIG. 2. The responding signal $C_{10}$ is preferably transmitted from the same transceiver or transducer pair of the array 121 that received the signal $C_8$. This signal is received and recognized by the platform P ("RX:$C_{10}$"). Shortly thereafter, the platform P transmits from transmitting pair 2A, 2B another initiating ultrasonic signal with signal code $C_9$ also identifying beacon $B_2$. The signal $C_9$ is also received and recognized by the beacon $B_2$, and in response, beacon $B_2$ transmits another responding ultrasonic signal coded $C_{11}$ after the predetermined time delay from receiving the signal $C_9$, as illustrated in FIG. 2. The responding signal $C_{11}$ is preferably transmitted from the same transceiver of the array 121 that received the signal $C_9$. In the example shown in FIG. 5, this signal is not received by the platform P. There are many reasons why a signal may not be received by the intended recipient, including insufficient transmission amplitude, insufficient signal sensitivity at the recipient, multipath or noise.

In an alternative embodiment of the present invention, the system 100 includes radio frequency (RF) devices establishing an RF data communication link 119/129 between the platform and each beacon and/or among the beacons. The RF link provides an independent data communication channel between the platform and beacons (and/or beacon-to-beacon). The identification of a recipient for an ultrasonic signal can be communicated using the radio frequency data communication link 119/129 rather than by the encoding of the ultrasonic signal itself. One way of using the RF link to identify a recipient of a transmitted ultrasonic signal is to transmit an RF trigger signal identifying the recipient together with the ultrasonic signal. The recipient, upon receiving the ultrasonic signal, also transmits an RF acknowledge signal to indicate that the ultrasonic signal is successfully received. Because the RF signals travel at the speed of light (roughly 3 orders of magnitude faster than the speed of sound in air), they arrive at the recipient essentially instantaneously relative to the accompanying ultrasonic signals.

Figure 6A:
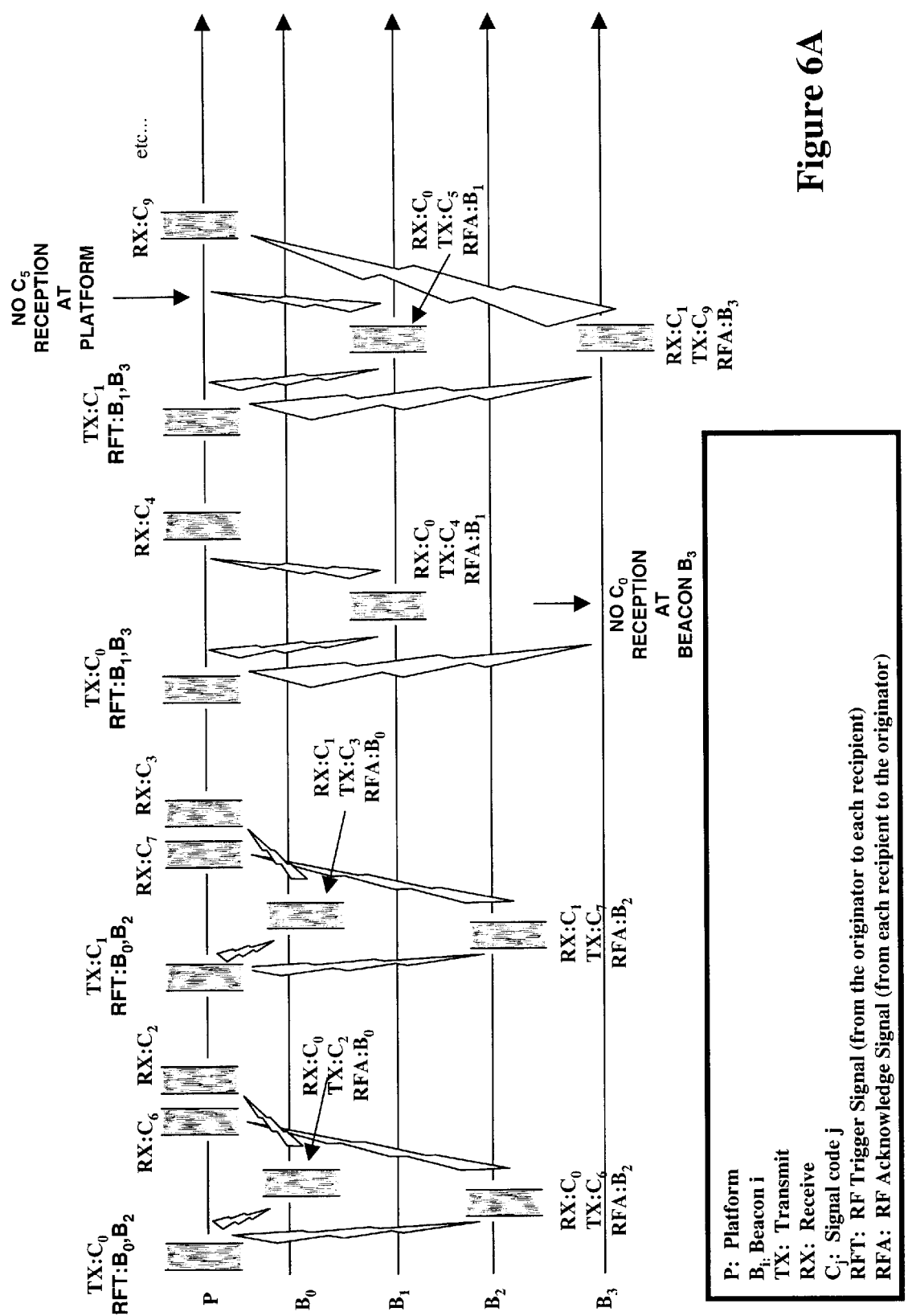
FIG. 6A is a time chart illustrating transmission and reception times for a set of ultrasonic signals accompanied by radio frequency signals between a mobile platform and a group of beacons in accordance with an embodiment of the present invention.

FIGS. 6A and 6B illustrate a polling scheme using the RF link 119/129 for a system 100 having one platform P and four beacons $B_0$, $B_1$, $B_2$, and $B_4$. In this example, it is assumed that the initiator does not possess knowledge of what transducer face in its array 111/121 is most optimal for transmission, so that each recipient is signaled twice in succession, as in the previous scheme with the RF link unavailable. As shown in FIGS. 6A and 6B, the platform P transmits ("TX") an initiating ultrasonic signal $C_0$ from transmitting pair 1A and 1B of the array 111. At approximately the same time, the platform P also transmits through the RF link 119 either one RF trigger signal ("RFT") identifying both beacon $B_0$ and beacon $B_2$ as the recipients for the ultrasonic signal $C_0$, or two RF trigger signals, one identifying beacon $B_0$ and another identifying beacon $B_2$. The RFT identifying beacon $B_2$ is received at beacon $B_2$, triggering $B_2$ to accept the ultrasonic signal $C_0$ that arrives shortly after. After a predetermined delay, the beacon $B_2$ transmits a responding ultrasonic signal $C_6$ from the same transceiver in the array 121 that received the ultrasonic signal $C_0$. At approximately the same time, the beacon $B_2$ also transmits through the RF link 129 an RF acknowledge signal ("RFA") identifying the beacon $B_2$ as the initiator and the platform P as the recipient for the ultrasonic signal $C_6$.

The RFT identifying $B_0$ is received at the beacon $B_0$, triggering $B_0$ to accept the ultrasonic signal $C_0$ that arrives shortly after the RFT. After a predetermined delay, the beacon $B_0$ transmits a responding ultrasonic signal $C_2$ from the same transceiver in the array 121 positioned on the beacon $B_0$ that received the ultrasonic signal $C_0$. At approximately the same time, the beacon $B_0$ also transmits through the RF link 129 an RF acknowledge signal ("RFA") identifying the beacon $B_0$ as the initiator and the platform P as the recipient for the ultrasonic signal $C_2$. The responding ultrasonic signal arrives at the platform P shortly after the corresponding RFA arrives at the platform. Since the RFA from $B_2$ is received before the RFA from $B_0$ is received, the platform knows that the signal $C_6$ is from $B_2$ and the signal $C_2$ is from $B_0$ because $C_6$ is received before $C_0$.

As illustrated in FIGS. 6A and 6B, this process is repeated again for beacons $B_0$ and $B_2$, except that this time, the initiating ultrasonic signal $C_1$ is transmitted from the transmitting pair 2A and 2B. Next, the platform goes ahead to poll the other two beacons also twice, once by transmitting the initiating ultrasonic signals from transmitting pairs 1A and 1B, and once from transmitting pairs 2A and 2B. In the example shown in FIG. 6A, some of these signals are not received at the intended recipients (e.g., because of the direction of transmission or signal strength of the transmitted signals).

In addition to providing identification of the initiator and/or the recipient(s) for a respective transmission, the trigger message may also provide information regarding additional fixed turn-around delays that are unique to each recipient. In some implementations, the "fixed" turn-around delay of each distinct beacon is adjustable or programmable, enabling the system to adjust the turn-around delays so as to minimize the probability of overlapping signal returns.

Overlapping signal returns are highly undesirable because they result in increased receiver noise and may also prohibit successful signal detection back at the initiator. Simultaneous (or nearly simultaneous) signaling to multiple recipients is feasible in cases where a priori knowledge of expected time-of-flight is available, which is often the case shortly after system startup, when the positioning or navigation system 100 has reached steady state performance, and the approximate relative positions of the platform and the beacons have already been determined.

Another use of the RF link is to add a power-saving feature to the system 100, whereby the beacons can be remotely switched to a low-power sleep mode when the system 100 is not operational.

Although some signals are not received by their intended recipients, in many cases (with or without the RF link), both polling trials targeted at the same beacon result in signal detection at the beacon(s) and the platform. Frequently, when both attempts to signal a particular intended recipient are successful, one of the two resulting distance measurements between the platform and beacon is possibly erroneous due to signal multipath. Normally, the erroneous measurement corresponds to a longer path and hence a longer time-of-flight and is therefore easy to recognize. The positioning or navigation algorithm in the system 100 detects and ignores these erroneous measurements. More specifically, the system is configured to use only the shorter of the two measurements in cases where both two-way measurements are successful. This procedure can be optimized when the optimal face to transmit from is known. Depending on the array design and accuracy requirements, it may also be necessary to take into consideration the geometric difference between the transducer face centers and the reference position of the respective beacon (typically the center of the array head).

In a further embodiment of this invention, the CPU 114 may be distributed between the system 100 and a remote station, where data is communicated between the platform and the remote station using radio frequency devices. In one version of this embodiment, the initializing ultrasonic signals are sent from the beacons, with the platform responding to the beacons by sending a responding ultrasonic signal for each received initializing ultrasonic signal. The beacons transmit the resulting distance measurements to the remote station, which in turn computes the location of the platform. The resulting location information is then sent to the platform for use in navigation of the platform.

In one embodiment of the present invention, the coordinate frame for the platform P is a local coordinate system tied to the beacon locations, rather than an absolute coordinate frame tied to an external reference (such as absolute latitude and longitude). Algorithms for trilateration or tracking (e.g. Kalman Filtering) well known to those in the art are used to solve for the position of the platform. The equations to be solved are inherently nonlinear. One algorithm for positioning of a static platform can be found in an article by Figueroa, F. and Mahajan, A., "A Robust Navigation System for Autonomous Vehicles using Ultrasonics," *Control Engineering Practice,* Vol. 2, No. 1, pp. 49–54, February, 1992. This algorithm includes the speed of sound as an unknown to be solved for by using the time-of-flight measurements. In matrix form, $$\begin{bmatrix} (tof_0/2)^2 \\ (tof_1/2)^2 \\ \vdots \\ (tof_{N-1}/2)^2 \end{bmatrix} = \begin{bmatrix} 1 & r_0^2 & 2x_0 & 2y_0 & 2z_0 \\ 1 & r_1^2 & 2x_1 & 2y_1 & 2z_1 \\ \vdots & \vdots & \vdots & \vdots & \vdots \\ 1 & r_{N-1}^2 & 2x_{N-1} & 2y_{N-1} & 2z_{N-1} \end{bmatrix} \begin{bmatrix} p^2/c^2 \\ 1/c^2 \\ -u/c^2 \\ -v/c^2 \\ -w/c^2 \end{bmatrix} \quad (1)$$

where:
- $tof_i$=two-way time-of-flight to ith beacon, where i=0, 1, . . . , N−1;
- $(x_i, y_i, z_i)$=coordinates of the ith beacon;
- $r_i = x_i^2 + y_i^2 + z_i^2$;
- (u, v, w)=coordinates of the platform P;
- c=speed of sound; and
- $p = u_i^2 + v_i^2 + w_i^2$.

The above formulation is sub-optimal due to the fact that it contains a redundant unknown (p), but is nonetheless simple, which is easily solved as long as at least 5 measurements from five different beacons are available and geometric singularity conditions, such as all beacons lying in a same plane for 3D implementation or on a same line for 2D implementation, are avoided. This model assumes that the measurements are taken while the platform is stationary or slow moving, the average speed of sound is constant amongst the various lines-of-sight, and measurement biases (e.g., the fixed time delays at the recipient devices) have been removed from the time-of-flight values.

Alternatively, a common approach to positioning a static or slow-moving platform involves an iterative least-squares adjustment resulting from linearizing a nonlinear set of equations, as in the following $$\begin{bmatrix} tof_0/2 \\ tof_1/2 \\ \vdots \\ tof_{N-1}/2 \end{bmatrix} = \begin{bmatrix} \sqrt{(u-x_0)^2 + (v-y_0)^2 + (w-z_0)^2} \\ \sqrt{(u-x_1)^2 + (v-y_1)^2 + (w-z_1)^2} \\ \vdots \\ \sqrt{(u-x_{N-1})^2 + (v-y_{N-1})^2 + (w-z_{N-1})^2} \end{bmatrix}$$

where an initial approximate position (u, v, w) of the platform P is assumed to be known. The idea is to successively compute improved estimates of the platform position $(u+\Delta u, v+\Delta v, w+\Delta w)$ and the speed of sound $c+\Delta c$, using the following set of equations:

$$\Delta \vec{m} = A \Delta \vec{x} \text{ or,} \quad (2)$$

$$\begin{bmatrix} \Delta m_0 \\ \Delta m_1 \\ \vdots \\ \Delta m_{n-1} \end{bmatrix} = \begin{bmatrix} \frac{(u-x_0)}{d_0} & \frac{(v-y_0)}{d_0} & \frac{(w-x_0)}{d_0} & -\frac{d_0}{c} \\ \frac{(u-x_1)}{d_1} & \frac{(v-y_1)}{d_1} & \frac{(w-z_1)}{d_1} & -\frac{d_1}{c} \\ \vdots & \vdots & \vdots & \vdots \\ \frac{(u-x_{n-1})}{d_{n-1}} & \frac{(v-y_{n-1})}{d_{n-1}} & \frac{(w-z_{n-1})}{d_{n-1}} & -\frac{d_{n-1}}{c} \end{bmatrix} \begin{bmatrix} \Delta u \\ \Delta v \\ \Delta w \\ \Delta c \end{bmatrix}$$

where: $\Delta m_i = c(tof_i/2) - d_i$ is the ith measurement residual, i=0, 1, . . . , n−1, where c is the current approximate speed of sound estimate, which can be calculated initially based on current temperature and possible relative humidity readings, and n is the number of beacons for which measurements are available;

$\Delta \vec{m} = (\Delta m_0 \ \Delta m_1 \ \ldots \ \Delta m_{n-1})^T$ is a vector of measurement residuals;

$(u, v, w)^T$ is the current platform position estimate;

$(\Delta u, \Delta v, \Delta w)^T$ is the platform position differential correction;

$\Delta c$ is the speed of sound differential correction;

$\Delta \vec{x} = (\Delta u \ \Delta v \ \Delta w \ \Delta c)^T$ is a vector of the unknowns; and $$A = \begin{bmatrix} \frac{(u-x_0)}{d_0} & \frac{(v-y_0)}{d_0} & \frac{(w-x_0)}{d_0} & -\frac{d_0}{c} \\ \frac{(u-x_1)}{d_1} & \frac{(v-y_1)}{d_1} & \frac{(w-z_1)}{d_1} & -\frac{d_1}{c} \\ \vdots & \vdots & \vdots & \vdots \\ \frac{(u-x_{n-1})}{d_{n-1}} & \frac{(v-y_{n-1})}{d_{n-1}} & \frac{(w-z_{n-1})}{d_{n-1}} & -\frac{d_{n-1}}{c} \end{bmatrix}$$

is a matrix of measurement partial derivatives.

A weighted least-squares solution to the above Equation (2) is given by $$\Delta \vec{x} = (A^T W A) A^T W \vec{r}$$

where $\vec{r} = (\vec{r}_1 \ \vec{r}_2 \ \ldots \ \vec{r}_n)$, and W is a weighting matrix having diagonal elements $\sigma_0^2 \ \sigma_1^2 \ \ldots \ \theta_{n-1}^2$ with all other elements being zero, where $\sigma_i^2$ is an error variance for the ith measurement. The error variance represents the uncertainty of the measurement and is assumed known in advance. In cases where the measurement variance is not known, W may be taken to identity (i.e. all $\sigma_i^2$ equal to one), resulting in an unweighted solution. The improved estimates of platform position and speed of sound scaling factor are computed as described and provides the maximum likelihood estimate of these parameters. The procedure can be iterated (i.e., take the improved estimate of $(u+\Delta u, v+\Delta v, w+\Delta w)$ as the new approximate position and repeat) until sufficient convergence (or divergence in a pathological case) is detected. An advantage of the iterative techniques using equation (2) over the former linear method of equation (1) is that the iterative method tends to provide more accurate position and speed of sound estimates. However, this iterative approach requires an approximate initial position and speed of sound for convergence. In some cases, such estimates may be unavailable and Equation (1) can be solved first to provide this initial estimate for subsequent iteration using Equation (2).

In an alternative embodiment of the invention, the speed of sound is assumed known. For example, the speed of sound may be computed from environmental readings or from inter-beacon measurements. In this case, the unknowns are only the platform position coordinates $(u, v, w)$. Accordingly, the row dimension of Equations (1) or (2) is reduced by one.

In order to accurately utilize ultrasonic time-of-flight measurements when the platform is mobile, it is necessary that the platform either moves very slowly, so that movement during each measurement epoch can be ignored, [See C.—C. Tsai, "A Localization System of a Mobile Robot by Fusing Dead-Reckoning and Ultrasonic Measurements", IEEE Transactions on Instrumentation and Measurement, Vol. 47, No. 5, October 1998], or the movement of the platform during each measurement epoch is accurately modeled. The "movement modeling" requirement relates to the fact that the speed of sound in air is slow enough that in some situations platform movement during the time the signal travels from the beacon to the platform (and/or platform to beacon) can be significant. Therefore, system 100, when used in navigation applications involving wheeled mobile platforms, further includes a vehicle odometry control/feedback sensor 117a, and a field programmable gate array (or DSP) 118 coupled between the sensor 117a and the CPU 114. The system 100 may further include additional navigation sensors for improved accuracy, such as gyroscope(s) and accelerometer(s) 117b. These components provide a measure (or permits estimation) of translation and rotation of the platform P during the measurement cycle. The measurement model within the tracking algorithm is then augmented appropriately, such as, $$tof_i/2 = \frac{1}{c}\left(\sqrt{(u_{TX}-x_i)^2 + (v_{TX}-y_i)^2 + (w_{TX}-z_i)^2} + \sqrt{(u_{RX}-x_i)^2 + (v_{RX}-y_i)^2 + (w_{RX}-z_i)^2}\right)$$

where $(u_{TX}, v_{TX}, w_{TX})^T$ and $(u_{RX}, v_{RX}, w_{RX})^T$ are the positions of the platform at the time of transmission to the ith beacon and the time of reception from the ith beacon, respectively. The platform positions $(u_{TX}, v_{TX}, w_{TX})^T$ and $(u_{RX}, v_{RX}, w_{RX})^T$ may be related to the platform position at the time the measurement is incorporated using either measurements or estimates of vehicle orientation and velocity. Care must be taken to ensure that adequate computational consistency of coordinate frames (body frame, earth-referenced inertial frame and beacon-relative frame, etc.) is maintained when integrating sensors in a local navigation system.

Figure 8:
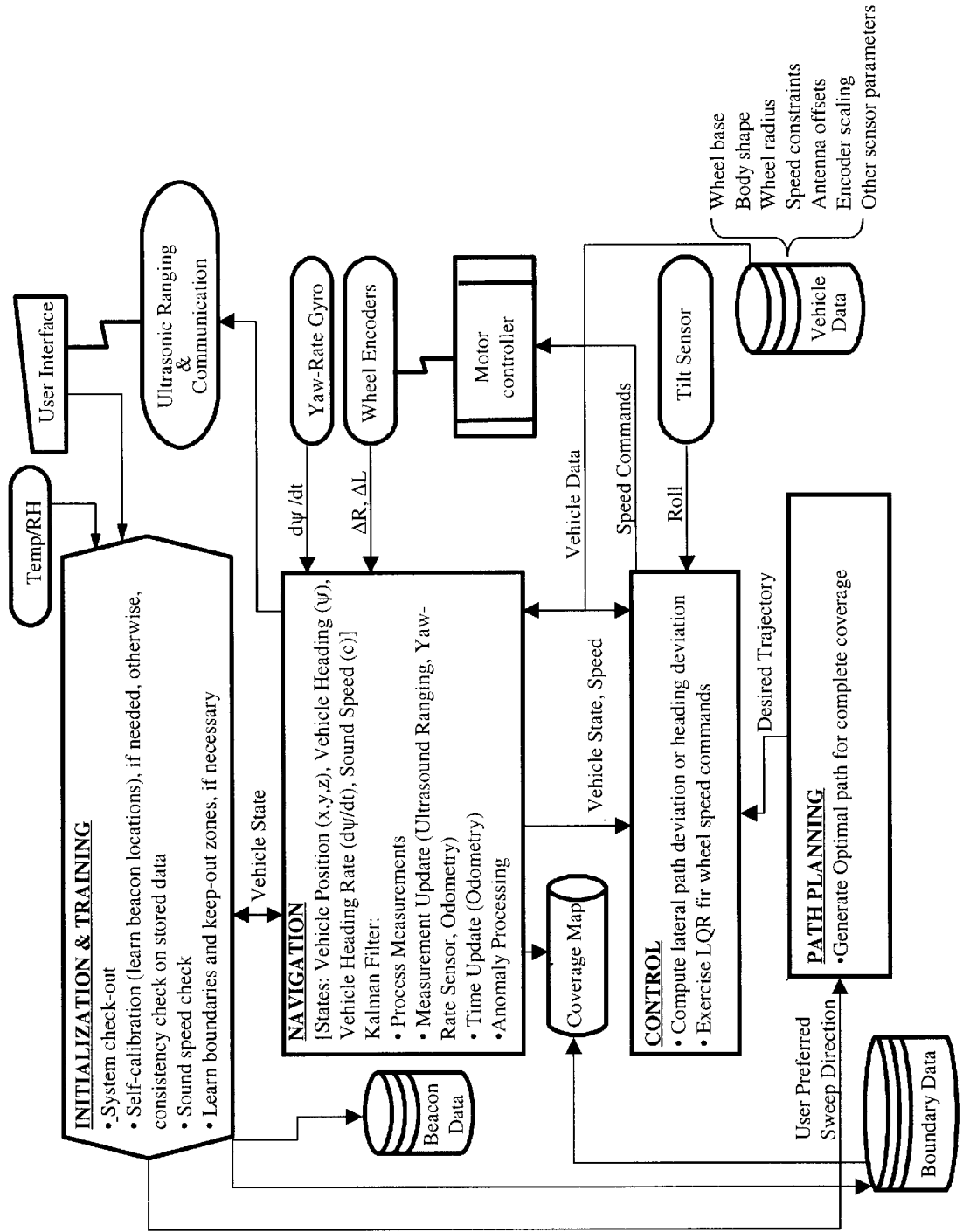
FIG. 8 is a navigation data flow diagram for a mobile platform in accordance with an embodiment of the present invention.

FIG. 8 is a navigation data flow diagram for a navigation system using the two-way ultrasonic positioning techniques of the present invention. Navigation algorithms for tracking mobile platforms are well known. See for example L. Kleeman, "Optimal estimation of position and heading for mobile robots using ultrasonic beacons and dead-reckoning", IEEE International Conference on Robotics and Automation, Nice, France, pp 2582–2587, May 10–15 1992 and J. J. Leonard and H. F. Durrant-Whyte. Mobile robot localization by tracking geometric beacons. IEEE Trans. Robotics and Automation, 7(3): 376–382, June 1991.

The positioning and navigation algorithms discussed above assume that the ultrasonic array on the platform array is located at a position reference point corresponding to the platform coordinates. If this is not the case, the measurement equations should be modified to include the body frame transformation from the ultrasonic array to the positioning reference point (e.g. from an array antenna on the top of a wheeled mobile robot to the center of its axle). This transformation requires knowledge of vehicle orientation, and the navigation-tracking algorithm includes estimation of the necessary parameters (e.g. vehicle heading in a 2D application).

Furthermore, it is understood that in practice erroneous measurements are likely to occur, such as those due to hardware anomalies and multipath. As a result, successful implementation of the described positioning and navigation algorithms should include some form of statistical outlier testing to detect and eliminate these erroneous measurements. Such tests are well known to those in the art and include externally Studentized residual tests and Kalman Filter innovations tests.

In a further embodiment of the present invention, inter-platform measurements and/or environmental readings such as temperature and possibly relative humidity readings are used to further enhance the speed of sound calculation. In the case that the speed of sound is not expected to vary spatially, (i.e. no large temperature gradients along the signal path), its average value can be modeled as a time-varying random constant. So at any given instant in time, the speed of sound in air is assumed constant throughout the service volume, but is expected to vary (slowly) in time. The variation can be computed from temperature/environmental readings or estimated based on, for example, platform-beacon or inter-beacon measurements. For the case that the system is self-calibrating, as explained in more detail below, the speed of sound during calibration is fixed using temperature and possibly relative humidity readings, but is solved for during subsequent operation. In one embodiment, the beacons are configured to periodically signal each other to measure the time-of-flight between the various beacon pairs. This information is then used to compute the current speed of sound. Since the inter-beacon distances are fixed, speed of sound computations based on inter-beacon time-of-flight measurements are typically very accurate.

In another embodiment, temperature and/or humidity sensors are incorporated into the platform and/or each of the beacons. The CPU in the platform or in a remote device receives the temperature information from all the beacons and the platform, and uses the temperature information to construct a spatially varying sound speed-scaling map. One approach is to compute a temperature dependent factor at each device (platform and beacon), $$f(T_k) = \sqrt{1 + \frac{T_k}{273}},$$

where $T_k$ is the temperature in Celsius at the $k^{ith}$ device. A modified measurement model is then used to compensate for spacial sound speed changes, $$tof_{or} = \frac{2}{(f(T_o) + f(T_r)) \times c}\sqrt{(x_o - x_r)^2 + (y_o - y_r)^2 + (z_o - z_r)^2}$$

where c represents an (overall) average sound speed value. The above model assumes that temperature changes linearly along the path, which is likely violated in any real environment. However, the error in making this approximation is small enough in many operating environments.

To eliminate the need for manual survey equipment for determining the positions of the beacons, the system can be self-calibrating. Typically self-calibration is only done once at initial installation, before training and using the system 100, unless the system 100 is later reconfigured. The self-calibration procedure determines the location of the beacons in a single local coordinate system. The self-calibration procedure of a local navigation system is simplified when all beacons are capable of ranging to each other. One approach to the self-calibration problem (for a two-dimensional case) can be found in E. LeMaster and S. Rock, Self-Calibration of Pseudolite Arrays Using Self-Differencing Transceivers, Institute of Navigation GPS-99 Conference, Nashville, Tenn., September 1999, which discusses a radio-frequency based ranging system using GPS-like signals.

In one embodiment of the present invention, inter-beacon measurements are used collectively to construct a relative coordinate system for subsequent positioning or navigation. First, all possible inter-beacon measurements are taken. Successful inter-beacon measurements require that the two beacons participating in a measurement cycle 200 possess line-of-sight visibility and are within range of one-another.

Improved accuracy is expected incorporates platform-beacon measurements from various locations in the service volume are incorporated. Note that the self-calibration discussion that follows assumes a 2D implementation. Extensions to 3D require only slight modification of these procedures. Also, the discussion assumes that the measurements are in terms of distance rather than time-or-flight, so that the conversion of signal time-of-flight to distance has already been completed.

Given only the distances between the beacons, the solution for the locations or coordinates of the beacons in a coordinate frame is not unique unless the arrangement of the beacons is constrained in some way. In one embodiment of the present invention, the N beacons $B_0, B_1, \ldots, B_{N-1}$ are first placed at various fixed locations throughout the service volume subject to the following constraints:

(1) The first 3 beacons $B_0$, $B_1$, and $B_2$ installed should be capable of measuring to each other and be in an arrangement that is not close to collinear (i.e. the first three beacons are within range and possess line-of-sight of each other, and not lying on or near a single line). Moreover, the arrangement of $B_0$-$B_1$-$B_2$ should be counterclockwise (i.e., if one is standing at beacon $B_0$ and looking toward $B_1$, $B_2$ should lie on the left).

(2) Additional beacons $B_3, B_4, \ldots, B_{N-1}$ are installed such that any beacon $B_k$ has visibility to at least 3 other beacons of the set $B_0, B_1, \ldots, B_{k-1}$ that are themselves not close to a collinear arrangement.

(3) Enough beacons are installed to provide adequate solution geometry throughout the service volume, preferably with redundancy for system robustness. In one embodiment of the present invention, the number of beacons is at least 4.

Figure 9:
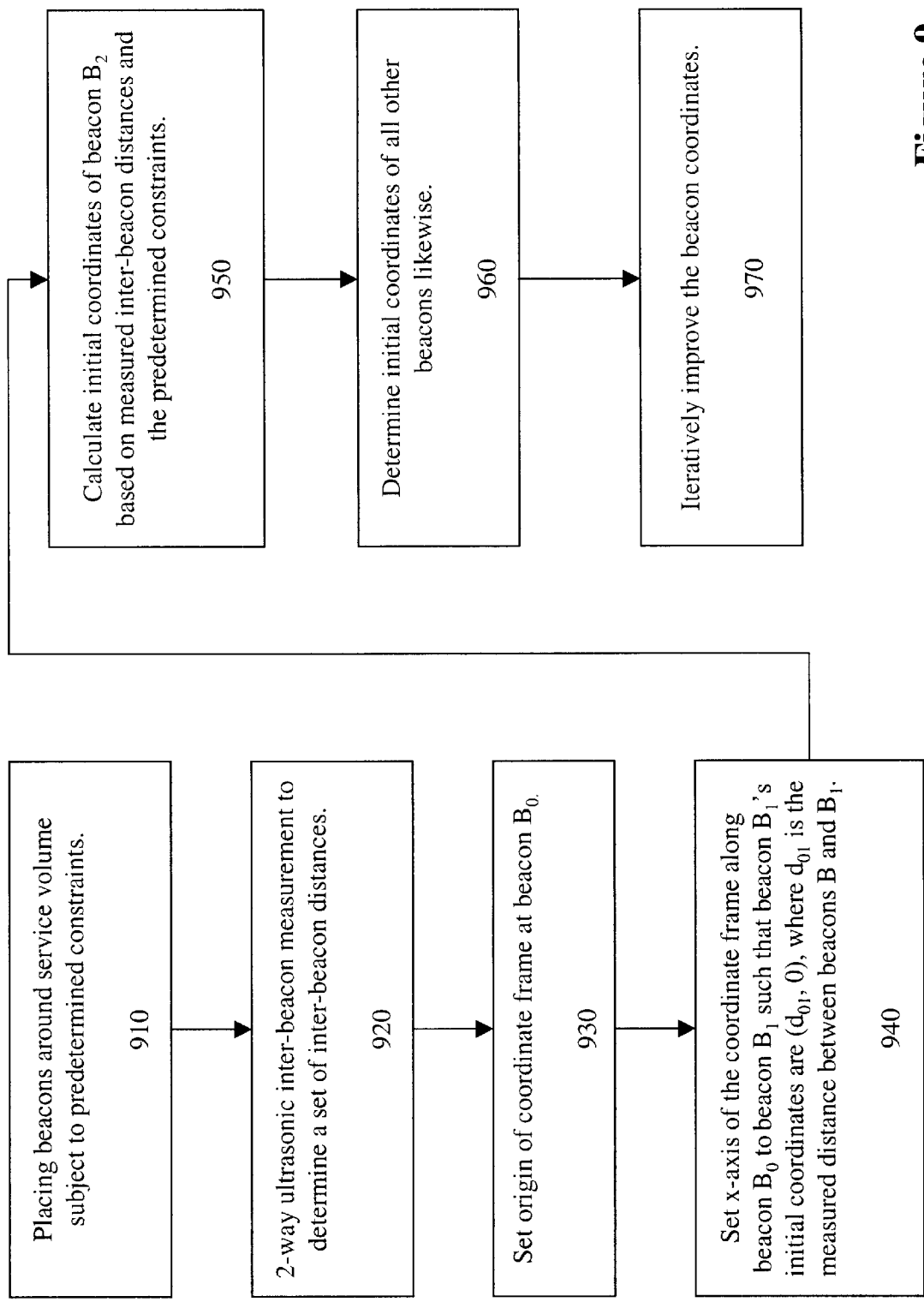
FIG. 9 is a flow chart illustrating the self-calibration procedure according to one embodiment of the present invention.

FIG. 9 illustrate a self-calibration procedure 900, according to one embodiment of the present invention. The self-calibration procedure 900 involves an iterative adjustment, requiring an initial condition that is subsequently improved with iteration. In one embodiment of the present invention, after the beacons are placed subject to the above constraint (step 910) and the inter-beacon measurements are done to determine a set of inter-beacon distances (step 920), $B_0$ is initially fixed as the origin of a coordinate frame for the system 100 (step 930), or $B_0$ has coordinates (0,0) in a 2D implementation. The direction from $B_0$ to $B_1$ initially defines the x-axis of the coordinate system (step 940). Therefore, $B_1$ initially has coordinates ($d_{01}$, 0), where $d_{01}$ is the distance between beacons $B_0$ and $B_1$, as determined by the inter-beacon measurements between the two beacons. The initial location of beacon $B_2$ is then determined by the law of cosines (step 950), i.e., $B_2=(x_2, Y_2)$, where $$x_2 = \frac{d_{01}^2 + d_{02}^2 - d_{12}^2}{2d_{01}} \quad \text{and} \quad y_2 = \sqrt{d_{02}^2 - x_2^2},$$

with $d_{02}$ and $d_{12}$ being the measured distances between $B_2$ and, respectively, $B_0$ and $B_1$. The y-coordinate of beacon $B_2$ is assumed positive due to the restriction that the beacon arrangement $B_0$-$B_1$-$B_2$ are counterclockwise. The coordinates of all other beacons are determined likewise (step 960). For example, the coordinates of beacon $B_k$ is determined after the locations of the beacons $B_0, B_1, \ldots, B_{k-1}$ are known.

Having determined the initial locations of the beacons, the exact locations of the beacons are iteratively improved (step 970). In one embodiment of the present invention, the Moore-Penrose pseudo-inverse method is used in the iteration process as described below. Each individual distance measurement $d_{ij}$ represents the distance between two beacons $B_i$ and $B_j$, such that $$d_{ij} = \sqrt{(x_i - x_j)^2 + (y_i - y_j)^2}.$$

The available measurements M are collected and arranged in vector form. The beacon coordinates are also arranged in a state vector having 2N elements:

$$\vec{x} = (x_0, y_0, x_1, y_1, \ldots, x_{N-1}, y_{N-1})^T,$$

and the correction to the beacon coordinates are arranged in a state correction vector $$\Delta \vec{x} = (\Delta x_0, \Delta y_0, \Delta x_1, \Delta y_1, \ldots, \Delta x_{N-1}, \Delta y_{N-1})^T.$$

The matrix equation for the coordinates correction is $$\Delta \vec{d} = A \Delta \vec{x},$$

where $\Delta \vec{d}$ is a vector of M measurement residuals, $$\Delta d_k = d_{ij} - \sqrt{(x_i - x_j)^2 + (y_i - y_j)^2},$$

and the kth row of the M by 2N matrix A has only four non-zero elements, $$A_{k,2i} = (x_i - x_j)/d_{ij}$$

$$A_{k,2i+1} = (y_i - y_j)/d_{ij}$$

$$A_{k,2j} = -(x_i - x_j)/d_{ij} = -A_{k,2i}$$

$$A_{k,2j+1} = -(y_i - y_j)/d_{ij} = -A_{k,2i+1}$$

So the matrix A has a rank of at most 2N−3 and is sparse, with relatively few non-zero elements. The state correction $\Delta \vec{x}$ is calculated as $$\Delta \vec{x} = A^+ \Delta \vec{d},$$

where $A^+$ is the Moore-Penrose pseudo-inverse of A. Efficient methods of computing the Moore-Penrose pseudo-inverse of a sparse matrix are well known to those in the art of numerical analysis. The iteration can be continued until sufficient convergence is detected (e.g., by monitoring the norm of the state correction $\|\Delta \vec{x}\|$), or until divergence is detected in the pathological case (e.g. too many iterations as a result of not enough valid measurements). The method automatically compensates for the fact that the matrix equation is rank-deficient.

In an alternative embodiment of the present invention, platform-beacon measurements are taken at various locations throughout the service volume for improved accuracy. In this case, the vector of unknowns expands to include the coordinates of the platform at each of these locations where the measurements are taken. In yet other embodiments of the present invention, geometrical and/or statistical tests are included to help eliminate erroneous measurements expected in practice.

Overall, the self-calibration procedure as discussed above is relatively straightforward, except that special care must be taken to resolve ambiguities and geometrical singularities (or poor conditioning) that can arise in practice. Also, convergence difficulties can arise if a poor initial condition is chosen, due to the nonlinear nature of the problem. The accuracy with which the beacon coordinates are known or calculated limits the overall positioning accuracy of the platform during operation of the system. A self-calibrating system is inherently less accurate than a system in which the beacon locations are accurately surveyed. Two factors that limit the accuracy of the self-calibration, and which can result in "dilution of precision" of platform position measurements, are the relative geometry of the beacons and the accuracy of the ranging measurements. It is the responsibility of the system installer (e.g., the user) to ensure that the system enjoys "good geometry," by placing sufficiently many beacons in the environment at favorable locations. For instance, the beacons should be placed at locations so that the mobile platform not only has a direct signaling path to at least four beacons at all positions within the allowed range of platform positions, but also the directions of the signal paths between the platform and the four beacons must be separated by at least a specified minimum angle (e.g., 20 degrees) at all possible platform locations. If it is not possible to meet these requirements using only four beacons, then the system should include one or more additional beacons so that there are always four beacons among the set of beacons in the system that meet these requirements for all possible positions of the mobile platform.

Other important factors affecting the resulting positioning or navigation accuracy include unknown platform characteristics and unknown local temperature and possibly relative humidity conditions, which result in uncertainty in the measurement model, including uncertainty in determining the local speed of sound and uncalibrated body frame biases. Signal processing errors and uncertainties concerning signal propagation time through the circuitry in the platform and beacons also reduce the accuracy of the self-calibration process and determination of the platform position. To the extent that the accuracy of the positioning system depends on the use of augmenting sensors, such as gyroscopes, accelerometers and wheel sensors, for determining the direction and speed of movement of the mobile platform, the accuracy of such sensors may limit the accuracy of the positioning system. Wheel slippage on the mobile platform, due to environmental conditions, may also reduce positioning accuracy.

What is claimed is:

1. A method of operating a positioning system having a plurality of objects each configured to transmit and receive ultrasonic signals, comprising
    transmitting an initiating ultrasonic signal from a first one of the plurality of objects, the initiating ultrasonic signal including a code identifying one or both of the first one and a second one of the plurality of objects;
    transmitting a responding ultrasonic signal from the second one of the plurality of objects after a predetermined time delay from receiving the initiating ultrasonic signal at the second one of the plurality of objects;
    receiving the responding ultrasonic signal at the first one of the plurality of objects; and
    determining a distance between the first one and the second one of the plurality of objects based on a time of transmitting the initiating ultrasonic signal, a time of receiving the responding ultrasonic signal, and the predetermined time delay.

2. The method of claim 1 wherein the first one of the plurality of objects includes an ultrasonic transceiver or transducer coupled to a matched filter, and wherein receiving the responding ultrasonic signal at the first one of the plurality of objects comprises:

producing a series of output values from the matched filter and determining a maximum output value among the series of output values; and determining the time of receiving the responding ultrasonic signal based on a time when the maximum output value is produced.

3. The method of claim 1 wherein the second one of the plurality of objects includes multiple ultrasonic transceivers or transducer pairs facing different directions, and transmitting the responding ultrasonic signal comprises:

determining a figure of merit for each ultrasonic transceiver or transducer pair receiving the initiating ultrasonic signal; and transmitting the responding ultrasonic signal from the ultrasonic transceiver or transducer pair having a highest figure of merit.

4. The method of claim 3 wherein each of the multiple ultrasonic transceivers or transducer pairs is coupled to a matched filter and wherein determining the figure of merit for an ultrasonic transceiver or transducer pair receiving the initiating ultrasonic signal comprises:

producing a series of output values from the matched filter coupled to the ultrasonic transceiver or transducer pair receiving the initiating ultrasonic signal; and determining the figure of merit based on a maximum output value among the series of output values.

5. The method of claim 1 wherein the responding ultrasonic signal is encoded to identify one or both of the first one and the second one of the plurality of objects.

6. A method of operating a positioning system having a plurality of objects each configured to transmit and receive ultrasonic signals, comprising transmitting an initiating ultrasonic signal from a first one of the plurality of objects, the initiating ultrasonic signal being accompanied by a radio frequency signal triggering a second one of the plurality of objects to receive the initiating ultrasonic signal;

transmitting a responding ultrasonic signal from the second one of the plurality of object;

receiving the responding ultrasonic signal at the first one of the plurality of objects; and determining a distance between the first one and the second one of the plurality of objects based on a time period starting at the transmission of said initiating ultrasonic signal and ending at the reception of said responding ultrasonic signal.

7. The method of claim 6 wherein the second one of the plurality of objects transmits the responding ultrasonic signal after a time delay from receiving the initiating ultrasonic signal.

8. The method of claim 7, wherein the radio frequency signal includes information for the time delay.

9. The method of claim 6 wherein the radio frequency signal is coded to identify one or both of the first one and the second one of the plurality of objects.

10. The method of claim 6 wherein the responding ultrasonic signal is accompanied by a radio frequency signal identifying one of both of the first one and the second one of the plurality of objects.

11. An ultrasonic positioning system, comprising:

a plurality of objects each configured to transmit and receive ultrasonic signals, a number of the plurality of objects being greater than 2;

a first ultrasonic array positioned on a first one of the plurality of objects and configured to transmit initiating ultrasonic signals, each initiating ultrasonic signal including a code that identifies another one of the plurality of objects for responding to the initiating ultrasonic signal;

a second ultrasonic array positioned on a second one of the plurality of objects and configured to respond to an initiating ultrasonic signal coded to identify the second one of the plurality of objects by transmitting a responding ultrasonic signal after a predetermined time delay from receiving an initiating ultrasonic signal; and wherein the first ultrasonic array is configured to receive the responding ultrasonic signal, and is coupled to a timer that records a time of transmitting the initiating ultrasonic signal and a time of receiving the responding ultrasonic signal; and wherein the first ultrasonic array is also coupled to a processor that determines a distance between the first one and the second one of the plurality of objects based on the recorded times, and the predetermined time delay.

12. The system of claim 11, wherein the first ultrasonic array includes a plurality of ultrasonic transceivers or transducer pairs facing different directions.

13. The system of claim 11, wherein the responding ultrasonic signal is encoded to identify the object from which the responding ultrasonic signal is transmitted.

14. The system of claim 12, wherein the plurality of ultrasonic transceivers or transducer pairs are divided into groups of ultrasonic transceivers or transducer pairs and different groups of ultrasonic transceivers or transducer pairs are configured to transmit initiating ultrasonic signals at different times and in different directions.

15. The system of claim 11, wherein the processor is configured to calculate a speed of sound based on the recorded times and the predetermined time delay.

16. The system of claim 15, further comprising:

temperature and humidity sensors coupled to the processor for providing temperature and humidity readings that are used by the processor to calculated the speed of sound.

17. The system of claim 15 wherein the first one of the plurality of objects is a mobile platform to be positioned and the second one of the plurality of objects is one of a plurality of beacons at fixed locations.

18. The system of claim 17 wherein the speed of sound is determined by inter-beacon ultrasonic measurements or ultrasonic measurements between the platform and a plurality of beacons.

19. An ultrasonic positioning system, comprising:

a plurality of objects each configured to transmit and receive ultrasonic signals;

a first ultrasonic array positioned on a first one of the plurality of objects and configured to transmit initiating ultrasonic signals;

a radio transmitter positioned on the first one of the plurality of objects and configured to transmit a radio frequency signal with each initiating ultrasonic signal to trigger another one of the plurality of objects to respond to the initiating ultrasonic signal;

a radio receiver positioned on a second one of the plurality of objects and configured to receive radio frequency signals; and a second ultrasonic array positioned on the second one of the plurality of objects and configured to receive initiating ultrasonic signals and to transmit a responding ultrasonic signal in response to receiving an initiating ultrasonic signal that follows a radio frequency signal triggering the second one of the plurality of objects to respond to the initiating ultrasonic signal; and wherein the first ultrasonic array is configured to receive the responding ultrasonic signal, and is coupled to a timer that records a time period between the transmission of the initiating ultrasonic signal and the reception of the responding ultrasonic signal.

20. The system of claim 19, further comprising a radio transmitter positioned on the second one of the plurality of objects, and configured to transmit a radio frequency signal with the responding ultrasonic signal to acknowledge receipt of the initiating ultrasonic signal by the second one of the plurality of objects.

21. The system of claim 19 wherein the ultrasonic array on the second one of the plurality of objects transmits the responding ultrasonic signal after a time delay from receiving the initiating ultrasonic signal that follows the radio frequency signal triggering the second one of the plurality of objects to respond to the initiating ultrasonic signal.

22. The system of claim 21 wherein the radio frequency signal further includes information of the time delay.

23. The system of claim 19, wherein the first one of the plurality of objects is a mobile platform to be positioned and the second one of the plurality of objects is one of a plurality of beacons at fixed locations.

24. A method for calibrating a positioning system having a plurality of beacons, comprising
placing the beacons in or around a service volume according to a set of predetermined constraints;
determining a set of inter-beacon distances using inter-beacon 2-way ultrasonic measurements;
setting the origin of a coordinate frame at a first beacon;
setting one axis of the coordinate frame along the direction from the first beacon and a second beacon;
determining initial coordinates of the second beacon based on the distance between the first beacon and the second beacon;
determining initial coordinates of a third beacon based on the distances between the first beacon and the second beacon, between the second beacon and the third beacon, and between the third beacon and the first beacon, and based on the predetermined constraints.

25. The method of claim 24, further comprising:
iteratively improving the initial coordinates to obtain final coordinates for the beacons.

26. The method of claim 1, wherein the first one of the plurality of objects includes multiple ultrasonic transducers or transceivers and the initiating ultrasonic signal is transmitted by different ultrasonic transducers or transceivers in different directions.

27. The method of claim 1, wherein the first one of the plurality of objects includes multiple ultrasonic transducers or transceivers each coupled to a matched filter, and wherein receiving the responding ultrasonic signal at the first one of the plurality of objects comprises:
for each ultrasonic transducer or transceiver receiving the responding ultrasonic signal, producing a series of output values from the matched filter coupled to the ultrasonic transducer or transceiver and determining a maximum output value for the ultrasonic transducer or transceiver among the series of output values;
determining a highest maximum output value among the maximum output values determined for the ultrasonic transducers or transceivers receiving the responding ultrasonic signal; and
determining the time of receiving the responding ultrasonic signal based on a time when the highest maximum output value is produced.

28. The system of claim 11, further comprising:
a matched filter coupled to each ultrasonic transceiver or transducer pair in the second ultrasonic array, the matched filter configured to produce an output value in response to an arrival of the initiating ultrasonic signal at the ultrasonic transceiver or transducer pair, wherein the output value is compared with a threshold to detect a reception of the initiating ultrasonic signal by the ultrasonic transceiver or transducer pair.

29. The system of claim 28, wherein the matched filter is configured to produce a series of output values in response to the reception of the initiating ultrasonic signal by the transceiver, and the processor is configured to select a maximum value among the series of output values as a figure of merit for the received initiating ultrasonic signal.

30. A mobile platform capable of positioning itself with respect to a plurality of beacons in fixed locations, comprising:
an ultrasonic array including a first set of ultrasonic transceivers or transducer pairs, the first set of ultrasonic transceivers or transducer pairs configured to transmit simultaneously a first set of initiating ultrasonic signals in different directions to poll a beacon;
a timer coupled to the ultrasonic array and configured to record a time of transmitting the first set of initiating ultrasonic signals by the first set of ultrasonic transceivers or transducer pairs and a time of receiving a responding ultrasonic signal from the beacon by one of the first set of ultrasonic transceivers or transducer pairs; and
a processor coupled to the timer and configured to determine a distance between the mobile platform and the beacon based on the time of transmitting the first set of initiating ultrasonic signals and the time of receiving the responding ultrasonic signal.

31. The mobile platform in claim 30 wherein the ultrasonic array further includes a second set of ultrasonic transceivers or transducer pairs, the second set of ultrasonic transceivers or transducer pairs configured to transmit a second set of initiating ultrasonic signals to poll the beacon subsequent to the transmission of the first set of initiating the ultrasonic signals, the second set of ultrasonic signals being transmitted in different directions from those in which the first set of ultrasonic signals have been transmitted.

32. The mobile platform in claim 30 wherein each initiating ultrasonic signal is coded to identify the beacon.

33. The mobile platform in claim 30 wherein each initiating ultrasonic signal is coded to identify the ultrasonic transceiver or transducer pair from which it is transmitted.

34. The mobile platform in claim 30, further comprising a matched filter coupled to each ultrasonic transceiver or transducer pair, the matched filter configured to produce output values in response to an arrival of the responding ultrasonic signal at the ultrasonic transceiver or transducer pair, wherein the processor is configured to compare the output values with a threshold value to detect a reception of the responding ultrasonic signal by the ultrasonic transceiver or transducer pair.

35. The mobile platform in claim 34 wherein the processor is configured to produce a figure of merit for the ultrasonic transceiver or transducer pair based on the output values when a reception of the responding ultrasonic signal is detected.

36. The mobile platform in claim 35, wherein the processor is further configured to determine the time of receiving the responding ultrasonic signal based on the figure of merit produced by the matched filter coupled to an ultrasonic transceiver or transducer pair receiving the responding ultrasonic signal.

37. The mobile platform in claim 30, further comprising a radio frequency transmitter coupled to the ultrasonic array and configured to transmit a radio frequency signal with the first set of ultrasonic signals to trigger the beacon to respond to at least one of the first set of ultrasonic signals.

38. A mobile platform capable of positioning itself with respect to a plurality of beacons, comprising
- an ultrasonic array configured to transmit a sequence of initiating ultrasonic signals to poll a beacon, the sequence of initiating ultrasonic signals including a first initiating ultrasonic signal transmitted in a first direction and a second initiating ultrasonic signal transmitted in a second direction different from the first direction, wherein the ultrasonic array is further configured to receive from the beacon a first responding ultrasonic signal corresponding to the first initiating ultrasonic signal and a second responding ultrasonic signal corresponding to the second initiating ultrasonic signal;
- a timer coupled to the ultrasonic array and configured to record a time of transmitting the first initiating ultrasonic signal, a time of receiving the first responding ultrasonic signal, a time of transmitting the second ultrasonic signal, and a time of receiving the second responding ultrasonic signal; and
- a processor coupled to the timer and configured to determine a distance between the mobile platform and the beacon based on a shorter one of a first time period and a second time period, wherein the first time period is between the time of transmitting the first initiating ultrasonic signal and the time of receiving the first responding ultrasonic signal, and the second time period is between the time of transmitting the second initiating ultrasonic signal and the time of receiving the second responding ultrasonic signal.

39. The method of claim 38 wherein the ultrasonic array includes a plurality of ultrasonic transceivers or transducer pairs facing different directions.

40. The method of claim 38, further comprising a radio transmitter coupled to the ultrasonic array and configured to transmit a radio frequency signal with each of the first and the second initiating ultrasonic signals to trigger the beacon to respond to the initiating ultrasonic signal.

41. A beacon for positioning a mobile platform, comprising:
- an ultrasonic array including multiple ultrasonic transceivers or transducer pairs facing different directions, each ultrasonic transceiver or transducer pair configured to transmit and receive ultrasonic signals;
- a matched filter coupled to each ultrasonic transceiver or transducer pair, and the matched filter configured to detect a reception of an ultrasonic signal by the ultrasonic transceiver or transducer pair and to produce a figure of merit when a reception is detected; and
- a processor coupled to the ultrasonic array and configured to select an ultrasonic transceiver or transducer pair to respond to the ultrasonic signal based on the figure of merit produced by the matched filter coupled to each ultrasonic transceiver or transducer pair receiving the ultrasonic signal.

42. A mobile platform capable of positioning itself with respect to a plurality of beacons using ultrasonic signals, comprising:
- an ultrasonic array configured to transmit and receive ultrasonic signals; and
- a radio transmitter configured to transmit a radio frequency signal associated with each of some or all of the ultrasonic signals transmitted by the ultrasonic array, the radio frequency signal triggering one or more of the plurality of beacons to receive the associated ultrasonic signal.

43. The mobile platform of claim 42 wherein the ultrasonic array includes multiple ultrasonic transceivers or transducer pairs, and the radio frequency signal includes a code identifying at least one ultrasonic transceiver or transducer pair.

44. The mobile platform of claim 43 wherein the multiple ultrasonic transceivers or transducer pairs face different directions.

45. The mobile platform of claim 42 wherein the radio frequency signal includes a code identifying the one or more of the plurality of beacons for receiving the ultrasonic signal.

46. A beacon for positioning a mobile platform, comprising:
- an ultrasonic array configured to transmit and receive ultrasonic signals; and
- a radio transmitter configured to transmit a radio frequency signal associated with each of some or all of the ultrasonic signals transmitted by the ultrasonic array, the radio frequency signal triggering the mobile platform to receive the associated ultrasonic signal.

47. A method of operating a positioning system having a plurality of objects each configured to transmit and receive ultrasonic signals, comprising
- from a first one of the plurality of objects, transmitting simultaneously a set of initiating ultrasonic signals for receipt by a second one of the plurality of objects, the set of initiating ultrasonic signals including ultrasonic signals transmitted in different directions;
- transmitting a responding ultrasonic signal from the second one of the plurality objects after a predetermined time delay from receiving one initiating ultrasonic signal by the second one of the plurality of objects, the one initiating ultrasonic signal being the first among the set of initiating ultrasonic signals to arrive at the second one of the plurality of objects;
- receiving the responding ultrasonic signal at the first one of the plurality of objects; and
- determining a distance between the first one and the second one of the plurality of objects based on a time of transmitting the set of initiating ultrasonic signal, a time of receiving the responding ultrasonic signal, and the predetermined time delay.

48. The method of claim 47 wherein the second one of the plurality of objects includes multiple ultrasonic transceivers or transducer pairs facing different directions, and transmitting the responding ultrasonic signal comprises:
- determining a figure of merit for each ultrasonic transceiver or transducer pair receiving the one initiating ultrasonic signal; and
- transmitting the responding ultrasonic signal from the ultrasonic transceiver or transducer pair having a highest figure of merit.

49. The method of claim 48, wherein each of the multiple ultrasonic transceivers or transducer pairs is coupled to a matched filter and wherein determining the figure of merit for an ultrasonic transceiver or transducer pair receiving the first initiating ultrasonic signal comprises:

producing a series of output values from the matched filter coupled to the ultrasonic transceiver or transducer pair receiving the one initiating ultrasonic signal; and determining the figure of merit based on a maximum output value among the series of output values.

50. The method of claim 49, further comprising transmitting a radio frequency signal with the set of initiating ultrasonic signals to trigger the second one of the plurality of objects to respond to the one initiating ultrasonic signal.

51. A method of operating a positioning system having a plurality of objects each configured to transmit and receive ultrasonic signals, comprising transmitting a first initiating ultrasonic signal in a first direction from a first one of the plurality of objects;

in response to receiving the first initiating ultrasonic signal by a second one of the plurality of objects, transmitting a first responding ultrasonic signal from the second one of the plurality of objects;

receiving the first responding ultrasonic signal at the first one of the plurality of objects;

computing a first time period starting at a time of transmitting the first initiating ultrasonic signal and ending at a time of receiving the first responding ultrasonic signal;

subsequent to transmitting the first initiating ultrasonic signal, transmitting a second initiating ultrasonic signal in a second direction from the first one of the plurality of objects, the second direction being different from the first direction;

in response to receiving the second initiating ultrasonic signal by the second one of the plurality of objects, transmitting a second responding ultrasonic signal from the second one of the plurality of objects;

receiving the second responding ultrasonic signal at the first one of the plurality of objects;

computing a second time period starting at a time of transmitting the second initiating ultrasonic signal and ending at a time of receiving the second responding ultrasonic signal; and determining a distance between the first one and the second one of the plurality of objects based on a shorter one of the first time period and the second time period.

52. The method of claim 51 wherein each of the first and the second initiating ultrasonic signals includes a code identifying one or both of the first and the second one of the plurality of objects.

53. The method of claim 51 wherein the first or the second responding ultrasonic signal is transmitted after a predetermined time delay from when the first or the second initiating ultrasonic signal, respectively, is received at the second one of the plurality of objects.

54. The method of claim 51, further comprising transmitting a radio frequency signal with each of the first and the second ultrasonic signals to trigger the second one of the plurality of objects to respond to the initiating ultrasonic signal.

55. The method of claim 51 wherein the first initiating ultrasonic signal is one of a plurality of ultrasonic signals transmitted simultaneously and in a first plurality of directions from the first one of the plurality of objects, the first plurality of directions being different from the second direction, and the first initiating ultrasonic signal is the first among the plurality of ultrasonic signals to arrive at the second one of the plurality of objects.

* * * * *